United States Patent
Dennis et al.

(10) Patent No.: US 11,603,216 B2
(45) Date of Patent: *Mar. 14, 2023

(54) LAUNCH AND/OR RECOVERY FOR UNMANNED AIRCRAFT AND/OR OTHER PAYLOADS, INCLUDING VIA PARACHUTE-ASSIST, AND ASSOCIATED SYSTEMS AND METHODS

(71) Applicant: Insitu, Inc., Bingen, WA (US)

(72) Inventors: Brian D. Dennis, Haiku, HI (US); Jacob Allen, Bingen, WA (US); Jeff Alldredge, Hood River, WA (US)

(73) Assignee: INSITU, INC., Bingen, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/445,067

(22) Filed: Aug. 13, 2021

(65) Prior Publication Data

US 2021/0371126 A1     Dec. 2, 2021

Related U.S. Application Data

(63) Continuation of application No. 16/367,023, filed on Mar. 27, 2019, now Pat. No. 11,142,339.

(Continued)

(51) Int. Cl.
  *B64F 1/02*    (2006.01)
  *B64C 39/02*   (2023.01)
  *B64D 17/78*   (2006.01)

(52) U.S. Cl.
  CPC .......... *B64F 1/029* (2020.01); *B64C 39/024* (2013.01); *B64D 17/78* (2013.01); *B64F 1/0295* (2020.01);

(Continued)

(58) Field of Classification Search
  CPC ...... B64F 1/029; B64F 1/0295; B64C 39/024; B64C 2201/182; B64C 2201/185; B64C 39/022; B64D 17/78
  See application file for complete search history.

(56) References Cited

U.S. PATENT DOCUMENTS

| 965,881 A | 8/1910 | Draper |
| 968,339 A | 8/1910 | Geraldson |

(Continued)

FOREIGN PATENT DOCUMENTS

| CN | 1032645 | 5/1989 |
| CN | 101549754 | 10/2009 |

(Continued)

OTHER PUBLICATIONS

"Ames Builds Advanced Yawed-Wing RPV," Aviation Week and Space Technology, Jan. 22, 1973, 2 pages.

(Continued)

*Primary Examiner* — Justin M Benedik
(74) *Attorney, Agent, or Firm* — Hanley, Flight & Zimmerman, LLC

(57) ABSTRACT

Launch and/or recovery for unmanned aircraft and/or other payloads, including via parachute-assist, and associated systems and methods are disclosed. An example unmanned aerial vehicle (UAV) system includes a lift device, a parachute, and a capture line. The lift device includes a canister. The parachute is stowed in and deployable from the canister. The capture line is attached to the parachute and to a line control device. The capture line is configured to be engaged by a capture device located at an end of a wing of a UAV.

24 Claims, 30 Drawing Sheets

Related U.S. Application Data

(60) Provisional application No. 62/667,334, filed on May 4, 2018.

(52) U.S. Cl.
CPC .. *B64C 2201/182* (2013.01); *B64C 2201/185* (2013.01)

(56) References Cited

U.S. PATENT DOCUMENTS

| | | |
|---|---|---|
| 975,953 A | 11/1910 | Hourwich |
| 1,144,505 A | 6/1915 | Steffan |
| 1,164,967 A | 12/1915 | Thorp |
| 1,317,631 A | 9/1919 | Kinser |
| 1,383,595 A | 7/1921 | Black |
| 1,384,036 A | 7/1921 | Anderson |
| 1,428,163 A | 9/1922 | Harriss |
| 1,499,472 A | 7/1924 | Pratt |
| 1,530,010 A | 3/1925 | Neilson |
| 1,532,736 A | 4/1925 | Dodds |
| 1,556,348 A | 10/1925 | Ray et al. |
| 1,624,188 A | 4/1927 | Simon |
| RE16,613 E | 5/1927 | Moody et al. |
| 1,634,964 A | 7/1927 | Steinmetz |
| 1,680,473 A | 8/1928 | Parker |
| 1,686,298 A | 10/1928 | Uhl |
| 1,712,164 A | 5/1929 | Peppin |
| 1,716,670 A | 6/1929 | Sperry |
| 1,731,091 A | 10/1929 | Belleville |
| 1,737,483 A | 11/1929 | Verret |
| 1,738,261 A | 12/1929 | Perkins |
| 1,748,663 A | 2/1930 | Tucker |
| 1,749,769 A | 3/1930 | Johnson |
| 1,756,747 A | 4/1930 | Holland |
| 1,777,167 A | 9/1930 | Forbes |
| 1,816,976 A | 8/1931 | Kirkham |
| 1,825,578 A | 9/1931 | Cernuda |
| 1,836,010 A | 12/1931 | Audrain |
| 1,842,432 A | 1/1932 | Stanton |
| 1,869,506 A | 8/1932 | Richardson |
| 1,892,357 A | 12/1932 | Moe |
| 1,909,445 A | 5/1933 | Ahola |
| 1,912,723 A | 6/1933 | Perkins |
| 1,925,212 A | 9/1933 | Steiber |
| 1,940,030 A | 12/1933 | Steiber |
| 1,960,264 A | 5/1934 | Heinkel |
| 2,211,089 A | 8/1940 | Berlin |
| 2,286,381 A | 6/1942 | Rubissow |
| 2,296,988 A | 9/1942 | Endter |
| 2,333,559 A | 11/1943 | Grady et al. |
| 2,342,773 A | 2/1944 | Wellman |
| 2,347,561 A | 4/1944 | Howard et al. |
| 2,360,220 A | 10/1944 | Goldman |
| 2,364,527 A | 12/1944 | Haygood |
| 2,365,778 A | 12/1944 | Schwab |
| 2,365,827 A | 12/1944 | Liebert |
| 2,380,702 A | 7/1945 | Persons |
| 2,390,754 A | 12/1945 | Valdene |
| 2,401,853 A | 6/1946 | Bailey |
| 2,435,197 A | 2/1948 | Brodie |
| 2,436,240 A | 2/1948 | Wiertz |
| 2,447,945 A | 8/1948 | Knowler |
| 2,448,209 A | 8/1948 | Boyer et al. |
| 2,465,936 A | 3/1949 | Schultz |
| 2,488,050 A | 11/1949 | Brodie |
| 2,488,051 A | 11/1949 | Brodie |
| 2,515,205 A | 7/1950 | Fieux |
| 2,526,348 A | 10/1950 | Gouge |
| 2,669,403 A | 2/1954 | McKay |
| 2,671,938 A | 3/1954 | Roberts |
| 2,735,391 A | 2/1956 | Buschers |
| 2,787,185 A | 4/1957 | Rea et al. |
| 2,814,453 A | 11/1957 | Trimble, Jr. et al. |
| 2,843,342 A | 7/1958 | Ward |
| 2,844,340 A | 7/1958 | Daniels et al. |
| 2,856,139 A | 10/1958 | Lockwood |
| 2,908,240 A | 10/1959 | Hodge |
| 2,919,871 A | 1/1960 | Sorensen |
| 2,933,183 A | 4/1960 | Koelsch |
| 2,937,827 A | 5/1960 | Duce |
| 2,954,946 A | 10/1960 | O'Neil et al. |
| 3,069,118 A | 12/1962 | Bernard |
| RE25,406 E | 6/1963 | Byrne et al. |
| 3,163,380 A | 12/1964 | Brodie |
| 3,268,090 A | 8/1966 | Wirkkala |
| 3,411,398 A | 11/1968 | Blakeley et al. |
| 3,454,244 A | 7/1969 | Walander |
| 3,468,500 A | 9/1969 | Carlsson |
| 3,484,061 A | 12/1969 | Niemkiewicz |
| 3,512,447 A | 5/1970 | Vaughn |
| 3,516,626 A | 6/1970 | Strance et al. |
| 3,589,651 A | 6/1971 | Niemkiewicz |
| 3,657,956 A | 4/1972 | Bradley et al. |
| 3,672,214 A | 6/1972 | Yasuda |
| 3,684,219 A | 8/1972 | King |
| 3,708,200 A | 1/1973 | Richards |
| 3,765,625 A | 10/1973 | Myhr et al. |
| 3,771,484 A | 11/1973 | Schott et al. |
| 3,827,660 A | 8/1974 | Doolittle |
| 3,939,988 A | 2/1976 | Wellman |
| 3,943,657 A | 3/1976 | Leckie |
| 3,980,259 A | 9/1976 | Greenhalgh et al. |
| 4,037,807 A | 7/1977 | Lohnston et al. |
| 4,067,139 A | 1/1978 | Pinkerton et al. |
| 4,079,901 A | 3/1978 | Mayhew et al. |
| 4,143,840 A | 3/1979 | Bernard et al. |
| 4,147,317 A | 4/1979 | Mayhew et al. |
| 4,149,840 A | 4/1979 | Tippmann |
| D256,816 S | 9/1980 | McMahon et al. |
| 4,236,686 A | 12/1980 | Barthelme et al. |
| 4,238,093 A | 12/1980 | Siegel et al. |
| 4,267,987 A | 5/1981 | McDonnell |
| 4,279,195 A | 7/1981 | Miller |
| 4,296,894 A | 10/1981 | Schnäbele et al. |
| 4,296,898 A | 10/1981 | Watson |
| 4,311,290 A | 1/1982 | Koper |
| 4,372,016 A | 2/1983 | LaViolette et al. |
| 4,408,737 A | 10/1983 | Schwaerzler |
| 4,410,151 A | 10/1983 | Höppner et al. |
| 4,457,479 A | 7/1984 | Daude |
| 4,471,923 A | 9/1984 | Höppner et al. |
| 4,523,729 A | 6/1985 | Frick |
| 4,566,658 A | 1/1986 | DiGiovanniantonio et al. |
| 4,645,142 A | 2/1987 | Soelter |
| 4,653,706 A | 3/1987 | Ragiab |
| 4,678,143 A | 7/1987 | Griffin |
| 4,730,793 A | 3/1988 | Thurber, Jr. et al. |
| 4,753,400 A * | 6/1988 | Reuter .................. B64F 1/027 244/116 |
| 4,790,497 A | 12/1988 | Yoffe |
| 4,809,933 A | 3/1989 | Buzby et al. |
| 4,842,222 A | 6/1989 | Baird |
| 4,909,458 A | 3/1990 | Martin |
| 4,979,701 A | 12/1990 | Colarik et al. |
| 4,991,739 A | 2/1991 | Levasseur |
| 5,007,875 A | 4/1991 | Dasa |
| 5,039,034 A | 8/1991 | Burgess et al. |
| 5,042,750 A | 8/1991 | Winter |
| 5,054,717 A | 10/1991 | Taylor |
| 5,060,888 A | 10/1991 | Vezain et al. |
| 5,109,788 A | 5/1992 | Heinzmann |
| 5,119,935 A | 6/1992 | Stump et al. |
| 5,145,129 A | 9/1992 | Gebhard |
| 5,176,339 A | 1/1993 | Schmidt |
| 5,222,694 A | 6/1993 | Smoot |
| 5,253,605 A | 10/1993 | Collins |
| 5,253,606 A | 10/1993 | Ortelli |
| 5,259,574 A | 11/1993 | Carrot |
| 5,378,851 A | 1/1995 | Brooke et al. |
| 5,390,550 A | 2/1995 | Miller |
| 5,407,153 A | 4/1995 | Kirk et al. |
| 5,509,624 A | 4/1996 | Takahashi |
| 5,583,311 A | 12/1996 | Rieger |
| 5,603,592 A | 2/1997 | Sadri et al. |

(56) References Cited

U.S. PATENT DOCUMENTS

| | | | |
|---|---|---|---|
| 5,655,944 A | 8/1997 | Fusselman | |
| 5,687,930 A | 11/1997 | Wagner et al. | |
| 5,762,456 A | 6/1998 | Aasgaard | |
| 5,816,761 A | 10/1998 | Cassatt et al. | |
| 5,906,336 A | 5/1999 | Eckstein | |
| 5,913,479 A | 6/1999 | Westwood, III | |
| 6,161,797 A | 12/2000 | Kirk et al. | |
| 6,237,875 B1 | 5/2001 | Menne et al. | |
| 6,264,140 B1 | 7/2001 | McGeer et al. | |
| 6,343,768 B1 | 2/2002 | Muldoon | |
| 6,370,455 B1 | 4/2002 | Larson et al. | |
| 6,371,410 B1 | 4/2002 | Cairo-Iocco et al. | |
| 6,416,019 B1 | 7/2002 | Hilliard et al. | |
| 6,442,460 B1 | 8/2002 | Larson et al. | |
| 6,457,673 B1 | 10/2002 | Miller | |
| 6,478,650 B1 | 11/2002 | Tsai | |
| 6,626,077 B1 | 9/2003 | Gilbert | |
| 6,695,255 B1 | 2/2004 | Husain | |
| 6,758,440 B1 | 7/2004 | Repp et al. | |
| 6,772,488 B1 | 8/2004 | Lensen et al. | |
| 6,835,045 B1 | 12/2004 | Barbee et al. | |
| 6,851,647 B1 | 2/2005 | Rosenbaum et al. | |
| 6,874,729 B1 | 4/2005 | McDonnell | |
| 6,925,690 B2 | 8/2005 | Sievers | |
| 7,059,564 B2* | 6/2006 | Dennis | B63B 27/26 244/110 G |
| 7,066,430 B2 | 6/2006 | Dennis et al. | |
| 7,090,166 B2 | 8/2006 | Dennis et al. | |
| 7,114,680 B2 | 10/2006 | Dennis | |
| 7,121,507 B2 | 10/2006 | Dennis et al. | |
| 7,128,294 B2 | 10/2006 | Roeseler et al. | |
| 7,140,575 B2 | 11/2006 | McGeer et al. | |
| 7,143,974 B2 | 12/2006 | Roeseler et al. | |
| 7,152,827 B2 | 12/2006 | McGeer | |
| 7,155,322 B2 | 12/2006 | Nakahara et al. | |
| 7,165,745 B2 | 1/2007 | McGeer et al. | |
| 7,175,135 B2 | 2/2007 | Dennis et al. | |
| 7,219,856 B2 | 5/2007 | Watts et al. | |
| 7,259,357 B2 | 8/2007 | Walker | |
| 7,264,204 B1 | 9/2007 | Portmann | |
| 7,410,125 B2 | 8/2008 | Steele | |
| 7,422,178 B2 | 9/2008 | DeLaune | |
| 7,472,461 B2 | 1/2009 | Anstee | |
| 7,510,145 B2 | 3/2009 | Snediker | |
| 7,578,467 B2 | 8/2009 | Goodrich | |
| 7,686,247 B1 | 3/2010 | Monson et al. | |
| 7,740,210 B2 | 6/2010 | Pilon et al. | |
| 7,748,661 B2 | 7/2010 | Harris et al. | |
| 7,798,445 B2 | 9/2010 | Heppe et al. | |
| 7,806,366 B2 | 10/2010 | Jackson | |
| 8,016,073 B2 | 9/2011 | Petzl et al. | |
| 8,028,952 B2 | 10/2011 | Urnes, Sr. | |
| 8,038,090 B2 | 10/2011 | Wilson et al. | |
| 8,136,766 B2 | 3/2012 | Dennis | |
| 8,172,177 B2* | 5/2012 | Lovell | B64C 39/024 244/110 F |
| 8,205,537 B1 | 6/2012 | Dupont | |
| 8,313,057 B2 | 11/2012 | Rednikov | |
| 8,348,714 B2 | 1/2013 | Newton et al. | |
| 8,387,540 B2 | 3/2013 | Merems | |
| 8,683,770 B2 | 4/2014 | diGirolamo et al. | |
| 8,820,698 B2 | 9/2014 | Balfour et al. | |
| 8,944,373 B2* | 2/2015 | Dickson | B64F 1/029 244/110 C |
| 8,950,124 B2 | 2/2015 | Wellershoff | |
| 9,085,362 B1 | 7/2015 | Kilian et al. | |
| 9,266,610 B2 | 2/2016 | Knapp et al. | |
| 9,340,301 B2 | 5/2016 | Dickson et al. | |
| 9,359,075 B1 | 6/2016 | von Flotow et al. | |
| 9,527,604 B2* | 12/2016 | Melish | B64F 1/025 |
| 9,932,110 B2 | 4/2018 | McNally | |
| 10,293,929 B2* | 5/2019 | von Flotow | B64D 5/00 |
| 10,518,903 B2 | 12/2019 | Sirvis et al. | |
| 11,027,844 B2* | 6/2021 | von Flotow | B64D 5/00 |
| 11,066,185 B2* | 7/2021 | Dennis | B64C 39/024 |
| 11,142,339 B2 | 10/2021 | Dennis et al. | |
| 2002/0011223 A1 | 1/2002 | Zauner et al. | |
| 2002/0049447 A1 | 4/2002 | Li | |
| 2002/0100838 A1 | 8/2002 | McGeer et al. | |
| 2003/0116107 A1 | 6/2003 | Laimbock | |
| 2003/0122384 A1 | 7/2003 | Swanson et al. | |
| 2003/0202861 A1 | 10/2003 | Nelson et al. | |
| 2003/0222173 A1 | 12/2003 | McGeer et al. | |
| 2004/0129833 A1 | 7/2004 | Perlo et al. | |
| 2005/0017129 A1 | 1/2005 | McDonnell | |
| 2005/0132923 A1 | 6/2005 | Lloyd | |
| 2005/0187677 A1 | 8/2005 | Walker | |
| 2006/0006281 A1 | 1/2006 | Sirkis | |
| 2006/0091258 A1 | 5/2006 | Chiu et al. | |
| 2006/0102783 A1 | 5/2006 | Dennis et al. | |
| 2006/0175466 A1 | 8/2006 | Snediker et al. | |
| 2006/0249623 A1 | 11/2006 | Steele | |
| 2006/0271251 A1 | 11/2006 | Hopkins | |
| 2007/0023582 A1 | 2/2007 | Steele et al. | |
| 2007/0051849 A1 | 3/2007 | Watts et al. | |
| 2007/0158498 A1 | 7/2007 | Snediker | |
| 2007/0200027 A1 | 8/2007 | Lohnson | |
| 2007/0261542 A1 | 11/2007 | Chang et al. | |
| 2008/0156932 A1 | 7/2008 | McGeer et al. | |
| 2008/0191091 A1 | 8/2008 | Hoisington et al. | |
| 2009/0114761 A1 | 5/2009 | Sells, II | |
| 2009/0191019 A1 | 7/2009 | Billings | |
| 2009/0194638 A1 | 8/2009 | Dennis | |
| 2009/0224097 A1 | 9/2009 | Kariv | |
| 2009/0236470 A1 | 9/2009 | Goossen et al. | |
| 2009/0294584 A1 | 12/2009 | Lovell et al. | |
| 2010/0181424 A1 | 7/2010 | Goossen et al. | |
| 2010/0237183 A1 | 9/2010 | Wilson et al. | |
| 2010/0243799 A1 | 9/2010 | Al-Qaffas | |
| 2010/0276537 A1 | 11/2010 | Kutzmann et al. | |
| 2010/0318475 A1 | 12/2010 | Abrahamson | |
| 2012/0210853 A1 | 8/2012 | Aberschitz et al. | |
| 2012/0223182 A1 | 9/2012 | Gilchrist, III et al. | |
| 2013/0082137 A1 | 4/2013 | Gundlach et al. | |
| 2013/0320138 A1 | 12/2013 | Dickson et al. | |
| 2014/0117147 A1 | 5/2014 | Hanna et al. | |
| 2015/0129716 A1 | 5/2015 | Yoffe | |
| 2015/0166177 A1 | 6/2015 | Bernhardt | |
| 2015/0239578 A1 | 8/2015 | McGeer | |
| 2016/0023760 A1 | 1/2016 | Goodrich | |
| 2016/0114906 A1 | 4/2016 | McGeer et al. | |
| 2016/0137311 A1 | 5/2016 | Peverill et al. | |
| 2016/0144980 A1 | 5/2016 | Kunz et al. | |
| 2016/0152339 A1 | 6/2016 | von Flotow et al. | |
| 2016/0251088 A1 | 9/2016 | Melish et al. | |
| 2016/0264259 A1 | 9/2016 | Dickson et al. | |
| 2016/0327945 A1 | 11/2016 | Davidson | |
| 2016/0375981 A1 | 12/2016 | McDonnell | |
| 2017/0158319 A1* | 6/2017 | von Flotow | B64C 1/30 |
| 2017/0225784 A1 | 8/2017 | Hayes et al. | |
| 2017/0369185 A1 | 12/2017 | Grubb | |
| 2018/0162528 A1 | 6/2018 | McGrew et al. | |
| 2018/0327113 A1* | 11/2018 | von Flotow | F15B 1/26 |
| 2019/0003511 A1 | 1/2019 | Leon et al. | |
| 2019/0006749 A1 | 1/2019 | Mack et al. | |

FOREIGN PATENT DOCUMENTS

| | | |
|---|---|---|
| CN | 102384702 | 3/2012 |
| DE | 4301671 | 7/1993 |
| DE | 19602703 | 2/1997 |
| DE | 102010010508 | 9/2011 |
| EP | 0742366 | 9/1998 |
| EP | 3150491 | 5/2017 |
| FR | 854371 | 4/1940 |
| GB | 1445153 | 8/1976 |
| GB | 2080216 | 2/1982 |
| GB | 2093414 | 9/1982 |
| GB | 2150895 | 7/1985 |
| GB | 2219777 | 12/1989 |
| GB | 2231011 | 11/1990 |
| IL | 76726 | 1/1991 |
| JP | 07304498 | 11/1995 |
| JP | 2008540217 | 11/2008 |

(56) References Cited

FOREIGN PATENT DOCUMENTS

| WO | 0075014 | 12/2000 |
|---|---|---|
| WO | 0107318 | 2/2001 |
| WO | 2005016753 | 2/2005 |
| WO | 2008015663 | 2/2008 |
| WO | 2011066400 | 6/2011 |
| WO | 2012047677 | 4/2012 |
| WO | 2014080386 | 5/2014 |

OTHER PUBLICATIONS

Robinson, "Dynamic Analysis of a Carousel Remotely Piloted Vehicle Recovery System," 1977, Naval Post-Graduate School Master's Thesis No. ADA052401, 70 pages.

Whitmore, "Development of a Closed-Loop Strap Down Attitude System for an Ultrahigh Altitude Flight Experiment," Jan. 1997, NASA Technical Memorandum 4775, 31 pages.

Dorr, "The XF-85 Goblin," https://www.defensemedianetwork.com/stories/the-sf-85-goblin-the-parasite-fighter-that-didnt-work/, DefenseMediaNetwork, Sep. 11, 2014, 5 pages.

Gross, "Investigation of Lift, Drag, and Aeordynamic Pitching Moment During In-Flight Recovery of a Remotely Piloted Vehicle," Air Force Institute of Technology, NTIS, Sep. 1973, 99 pages.

Phillips, "Alternate Aquila Recovery System Demonstration Recovery System Flight Test," Final Report, Jan. 19, 1977, 67 pages.

Plane Talk, The Newsletter of the War Eagles Air Museum, www.war-eagles-air-museum.com, vol. 25, No. 1, First Quarter Jan.-Mar. 2012, 8 pages.

Dickard, "Mini-RPV Recover System Conceptual Study," Contract DA4J02-76-C-0048, Report No. USAAMRDL-TR-77-24, pp. 1-2, 57-85, and 144-151, Published Aug. 1977, 40 pages.

Hunton et al., "An Investigation of the McDonnell XP-85 Airplane in the Ames 40 by 80 Foot Wind Tunnel—Force and Moment Tests," NACA Research Memorandum for the Air Material Command, U.S. Air Force, National Advisory Committee for Aeronautics, Sep. 27, 1948, 155 pages. (Uploaded in 2 parts).

Galinski et al., "Results of the Gust Resistant MAV Programme," $28^{th}$ International Congress of the Aeronautical Sciences, 2012, 10 pages.

European Patent Office, "Extended European Search Report," issued in connection with European Patent Application No. 19172607.4, dated Sep. 26, 2019, 10 pages.

European Patent Office, "Communication pursuant to Article 94(3) EPC," issued in connection with European Patent Application No. 19172607.4, dated Sep. 29, 2021, 5 pages.

United States Patent and Trademark Office, "Non-Final Office Action," issued in connection with U.S. Appl. No. 16/230,220, dated Feb. 2, 2021, 12 pages.

United States Patent and Trademark Office, "Notice of Allowance and Fee(s) Due," issued in connection with U.S. Appl. No. 16/230,220, dated Apr. 7, 2021, 9 pages.

United States Patent and Trademark Office, "Supplemental Notice of Allowability," issued in connection with U.S. Appl. No. 16/230,220, dated Jun. 25, 2021, 2 pages.

United States Patent and Trademark Office, "Notice of Allowance and Fee(s) Due," issued in connection with U.S. Appl. No. 16/367,023, dated May 27, 2021, 8 pages.

United States Patent and Trademark Office, "Supplemental Notice of Allowability," issued in connection with U.S. Appl. No. 16/367,023, dated Aug. 23, 2021, 2 pages.

United States Patent and Trademark Office, "Supplemental Notice of Allowability," issued in connection with U.S. Appl. No. 16/367,023, dated Sep. 15, 2021, 2 pages.

\* cited by examiner

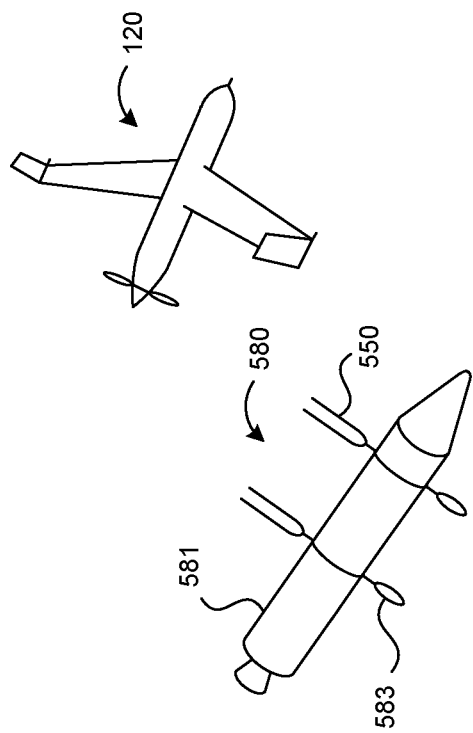
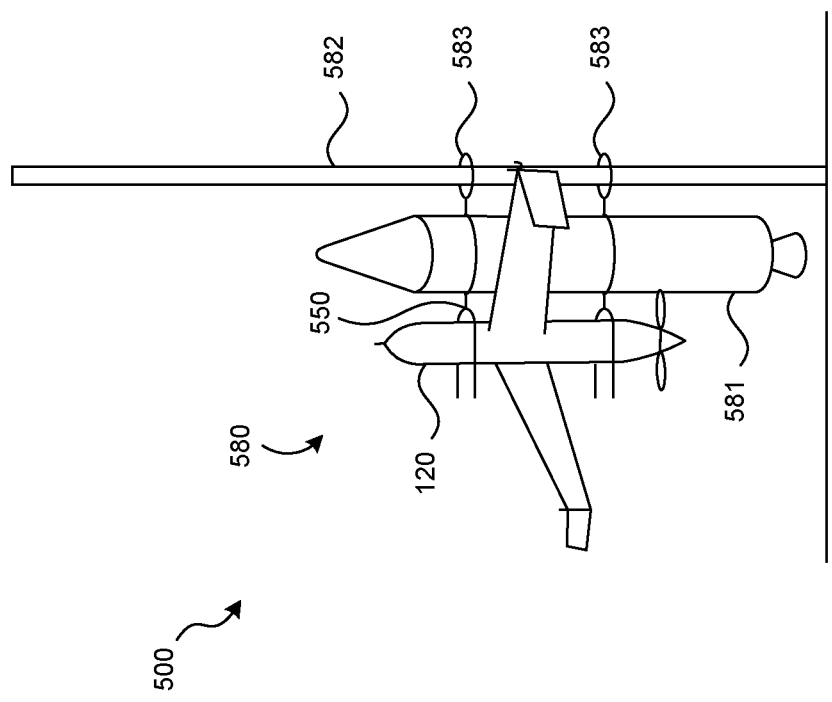
FIG. 5B
FIG. 5A

LAUNCH AND/OR RECOVERY FOR UNMANNED AIRCRAFT AND/OR OTHER PAYLOADS, INCLUDING VIA PARACHUTE-ASSIST, AND ASSOCIATED SYSTEMS AND METHODS

CROSS-REFERENCE TO RELATED APPLICATIONS

This application arises from a continuation of U.S. patent application Ser. No. 16/367,023, filed Mar. 27, 2019, which claims priority to U.S. Provisional Patent Application Ser. No. 62/667,334, filed May 4, 2018. The entireties of U.S. patent application Ser. No. 16/367,023 and U.S. Provisional Patent Application Ser. No. 62/667,334 are hereby incorporated herein by reference.

TECHNICAL FIELD

The present technology is directed generally to launch and/or recovery for unmanned aircraft and/or other payloads, including via parachute assist, and associated systems and methods.

BACKGROUND

Unmanned aircraft or aerial vehicles (UAVs) provide enhanced and economical access to areas where manned flight operations are unacceptably costly and/or dangerous. For example, unmanned aircraft outfitted with remotely controlled cameras can perform a wide variety of surveillance missions, including spotting schools of fish for the fisheries industry, monitoring weather conditions, providing border patrols for national governments, and providing military surveillance before, during and/or after military operations.

Existing unmanned aircraft systems suffer from a variety of drawbacks. For example, existing unmanned aircraft systems (which can include the aircraft itself along with launch devices, recovery devices, and storage devices) typically require a substantial amount of space. Accordingly, these systems can be difficult to install and operate in cramped quarters, such as the deck of a small fishing boat, land vehicle, or other craft. Another drawback with some existing unmanned aircraft is that, due to small size and low weight, they can be subjected to higher acceleration and deceleration forces than larger, manned air vehicles and can accordingly be prone to damage, particularly when manually handled during recovery and launch operations in hostile environments, such as a heaving ship deck. Yet another drawback with some existing unmanned aircraft systems is that they may not be suitable for recovering aircraft in tight quarters, without causing damage to either the aircraft or the platform from which the aircraft is launched and/or recovered. Accordingly, there remains a need for improved UAV launch and/or recovery systems.

BRIEF DESCRIPTION OF THE DRAWINGS

FIG. 5A is partially schematic illustration of a launcher that includes a rocket, in accordance with embodiments of the present technology.

FIG. 5B is a partially schematic illustration of the system shown in FIG. 5A, with the aircraft released by the rocket in accordance with embodiments of the present technology.

DETAILED DESCRIPTION

The present disclosure describes systems and methods for launching and/or recovering aircraft, in particular, unmanned aircraft. Many specific details of some embodiments of the disclosure are set forth in the following description and FIGS. 1-13C to provide a thorough understanding of these embodiments. Well-known structures, systems, and methods that are often associated with such embodiments, but that may unnecessarily obscure some significant aspects of the disclosure, are not set forth in the following description for purposes of clarity. Moreover, although the following disclosure sets forth some embodiments of the technology, some embodiments of the technology can have different configurations and/or different components than those described in this section. As such, the technology may include embodiments with additional elements, and/or without several of the elements described below with reference to FIGS. 1-13C.

For purposes of illustration, the relative scales of the system components described herein may be exaggerated. For example, the relative sizes of multiple UAVs used in a single system (e.g., one UAV to loft and/or capture another to carry out a mission) may be different than what is shown in the Figures.

Many embodiments of the technology described below may take the form of computer- or controller-executable instructions, including routines executed by a programmable computer or controller. Those skilled in the relevant art will appreciate that the technology can be practiced on computer/controller systems other than those shown and described below. The technology can be embodied in a special-purpose computer, controller or data processor that is specifically programmed, configured or constructed to perform one or more of the computer-executable instructions described below. Accordingly, the terms "computer" and "controller" as generally used herein refer to any data processor and can include Internet appliances and hand-held devices (including palm-top computers, wearable computers, cellular or mobile phones, multi-processor systems, processor-based or programmable consumer electronics, network computers, mini computers and the like). Information handled by these computers can be presented at any suitable display medium, including an LCD.

The technology can also be practiced in distributed environments, where tasks or modules are performed by remote processing devices that are linked through a communications network. In a distributed computing environment, program modules or subroutines may be located in local and remote memory storage devices. Aspects of the technology described below may be stored or distributed on computer-readable media, including magnetic or optically readable or removable computer disks, as well as distributed electronically over networks. Data structures and transmissions of data particular to aspects of the technology are also encompassed within the scope of embodiments of the technology.

Figure 1A:
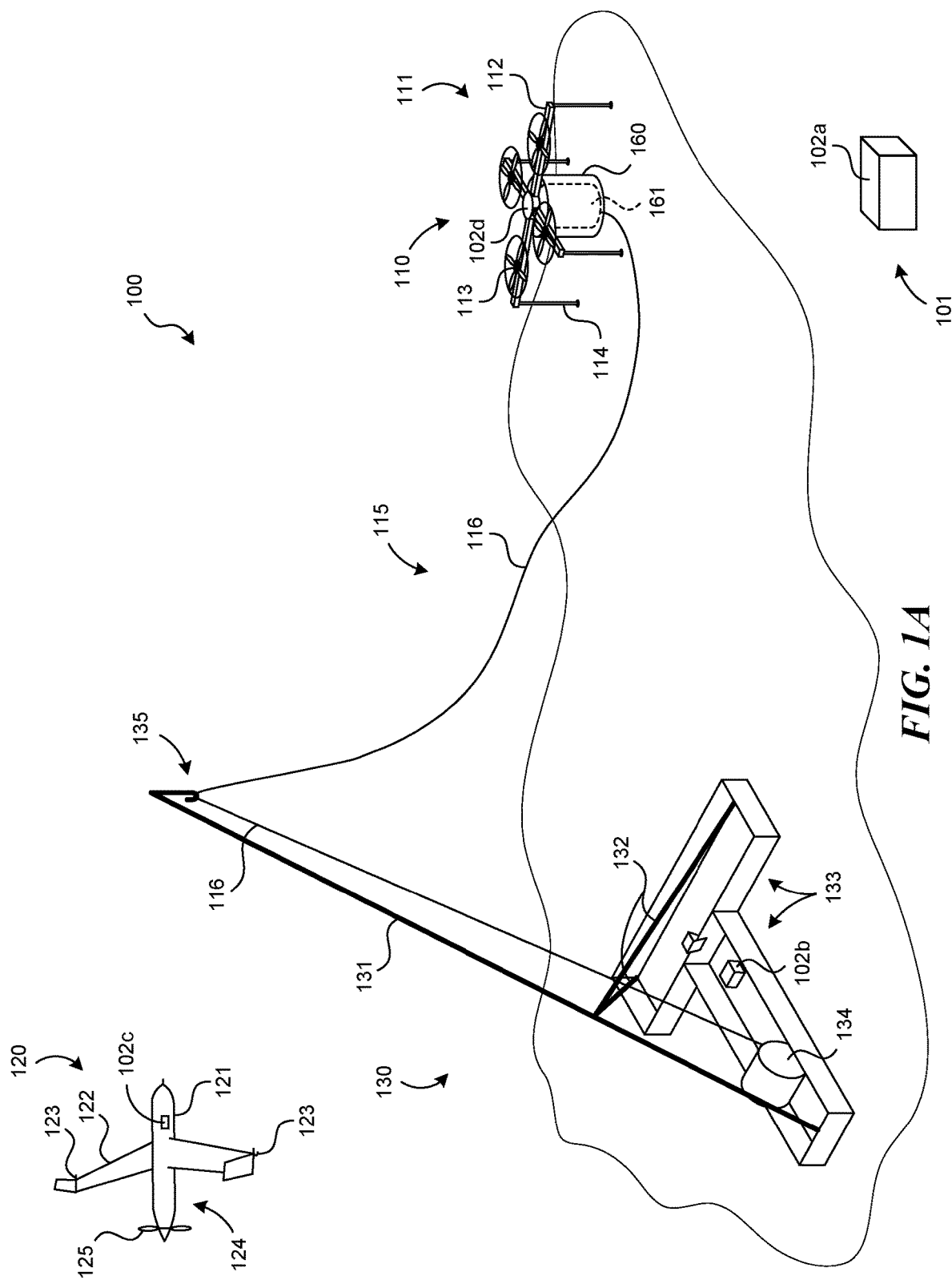
FIG. 1A is a partially schematic illustration of a system that includes a mission aircraft, a lift device, and a line control device configured in accordance with embodiments of the present technology.

FIG. 1A is a partially schematic illustration of a system 100 that includes a first or mission aircraft 120, a lift device 110, and a line control device 130. The mission aircraft 120 is typically an unmanned aerial vehicle that flies a reconnaissance, surveillance, and/or other mission under remote control, and/or autonomously. The lift device 110 carries a capture line 116 aloft toward the end of the mission. The mission aircraft 120 then engages the capture line 116, and the line control device 130 guides the captured mission aircraft to a safe landing. The lift device 110 can also include an aircraft, for example, a second aircraft 111 that carries a parachute 161. The parachute 161 can be used to control the motion of the capture line 116, as will be described in further detail below.

The first or mission aircraft 120 can include a fuselage 121, wings 122, and a propulsion system 124 that further includes one or more propellers 125 (e.g., a single propeller arranged in a pusher configuration). The mission aircraft 120 can include one or more first capture devices 123, for example, hooks or cleats at the ends of the wings 122 that are used to engage with the capture line 116. Accordingly, capture line 116 represents an example of a second capture device 115.

The capture line 116 is attached to the parachute 161, which can be stowed in a canister or other receptacle 160 carried by the lift device 110. In systems for which the lift device 110 includes a second aircraft 111, the lift device 110 can further include an airframe 112, rotors 113, and landing gear 114. The landing gear 114 are positioned and sized to allow the lift device 110 to land with the canister 160 attached.

The capture line 116 is also attached to the line control device 130. The line control device 130 can include a boom 131 having a line support element 135 (e.g., a hook, pulley, or other suitable device) through or around which the capture line 116 passes. The capture line 116 can be connected to a tension device 134 (e.g., a winch or other device that applies tension to, reels in, and/or otherwise applies forces to the capture line 116). Accordingly, the tension device 134 provides tension on the capture line 116 and/or can winch or reel in the capture line 116 to bring the captured mission aircraft 120 to a safe landing. The boom 131 can extend upwardly at an angle and can be supported by boom supports 132. The line control device 130 can be modular and can be broken down to fit into one or more shipping containers 133. Further details are described in U.S. Pat. No. 10,836,509, incorporated herein by reference.

The overall system 100 can include a control system 101, which in turn can include one or more controllers 102, four of which are shown in FIG. 1A as first-fourth controllers 102a-102d. The control system 101 can be used to control the operations of the line control device 130, the mission aircraft 120, and the lifting device 110, independently, or via a centralized controller 102a. Accordingly, any of the operational steps described herein can be conducted by, authorized by, initiated, and/or carried out via computer-executable instructions carried on any one or more of the components of the control system 101. The control system 101 can receive any of a variety of suitable inputs, e.g., from sensors and/or human operators, and issue corresponding instructions. Representative inputs include, among others, velocity, altitude, pressure, tension, force, and/or winch rotation speeds.

Figure 1B:
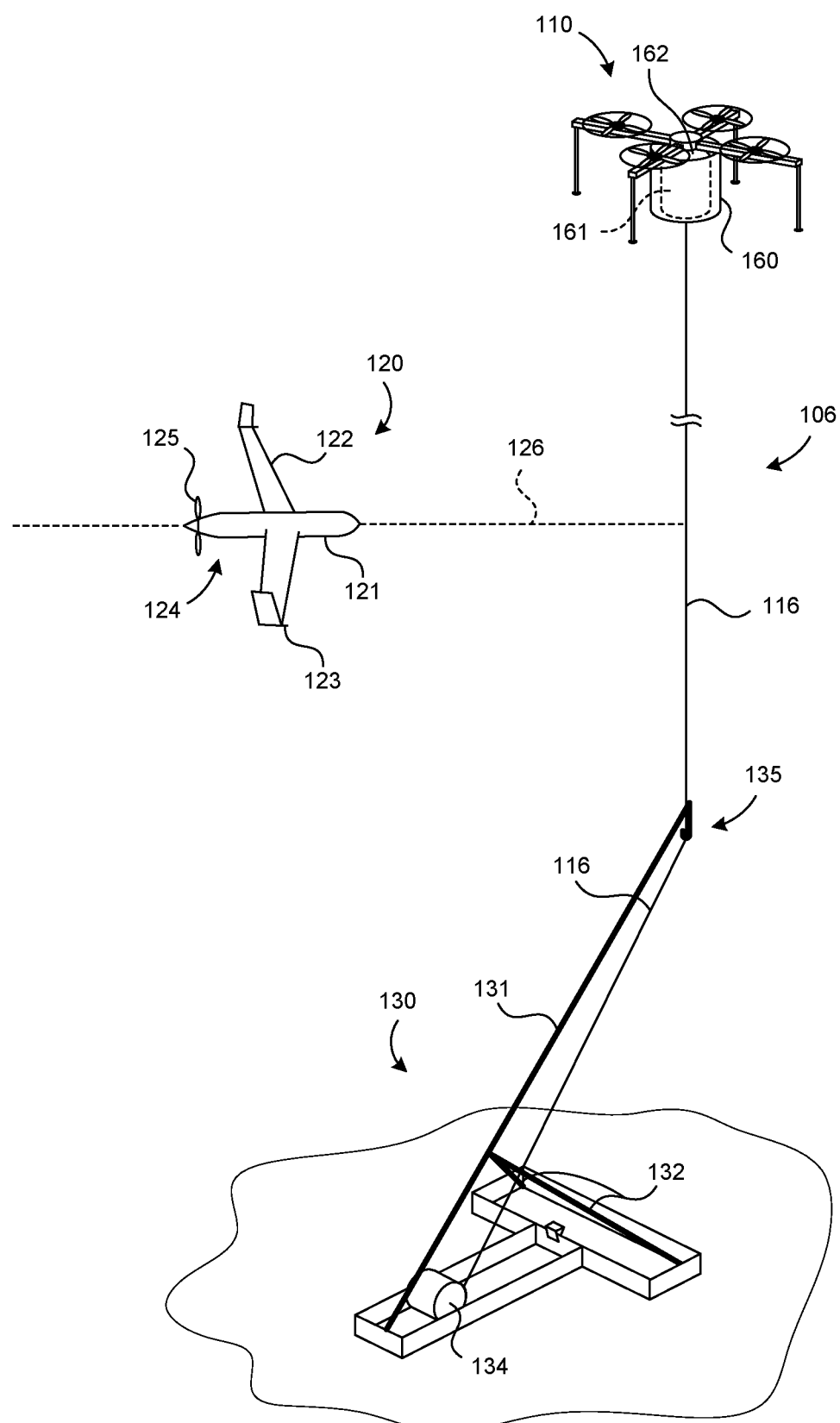
FIG. 1B is a partially schematic illustration of the system shown in FIG. 1A with the lift device positioned for an aircraft capture operation in accordance with embodiments of the present technology.

FIG. 1B illustrates the system 100 with the lift device 110 aloft, and with the capture line 116 positioned generally to intersect a flight path 126 of the mission aircraft 120. The mission aircraft 120 can be captured in accordance with one or more of a variety of suitable techniques. In a representative technique, the mission aircraft 120 engages the first capture device 123 carried at one of the wingtips 122, with the second capture device 106 (e.g., the capture line 116) while the parachute 161 is carried in the canister 160. The tensile force placed on the parachute 161 by the mission aircraft 120 as it engages with the capture line 116 pulls the parachute 161 out of the canister 160, so that the parachute 161 unfurls. The tension device 134 reels in the capture line 116 after (and, optionally, before) the mission aircraft 120 engages the capture line 116 to provide/maintain tension on the capture line 116 as the parachute 161 descends. The descent of the captured mission aircraft 120 is slowed by the deployed parachute 161, as will be described further with reference to FIG. 1C.

With continued reference to FIG. 1B, in other modes of operation, the parachute 161 can be deployed by directing the lift device 110 upwardly while the capture line 116 is prevented from unspooling any further from the tension device 134. Accordingly, the upward trajectory of the lift device 110 pulls the canister 160 away from the parachute 161, e.g., before the mission aircraft 120 strikes the capture line 116. In another mode of operation, the tension device 134 rapidly reels in the capture line 116 to pull the parachute 161 from the canister 160. In any of these embodiments, the action of deploying the parachute 161 from the canister 160 can be expedited and/or made more reliable via an extraction device 162 carried in or proximate to the canister 160. For example, the extraction device 162 can include a spring-powered piston that propels the parachute 161 from the canister 160, in response to an actuator signal delivered by an operator, or (automatically) in response to an increase in tension on the capture line 116.

Figure 1C:
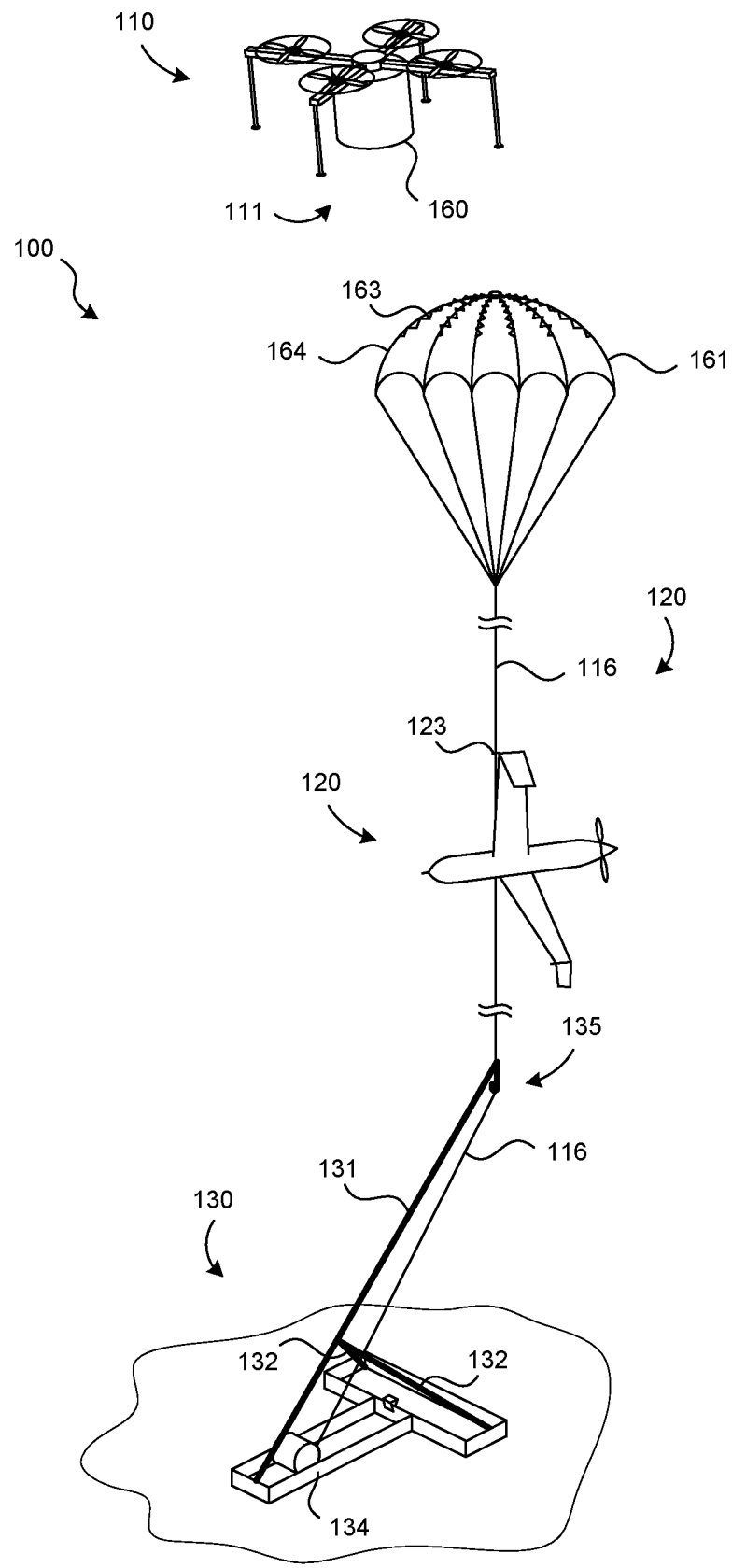
FIG. 1C is a partially schematic illustration of the system shown in FIG. 1A with the mission aircraft captured in accordance with embodiments of the present technology.

For any of the foregoing sequences, FIG. 1C illustrates the system 100 after the parachute 161 has been deployed from the canister 160. The lift device 110 stays in place or moves away from the parachute 161 (e.g., above the parachute 161) to avoid interfering with the process for capturing the mission aircraft 120. The parachute 161 can include stays or struts 164 that aid in opening the parachute 161 and/or keeping the parachute 161 open, and that can be actuated via expansion devices 163 (e.g., springs or other suitable devices) to increase the speed with which the parachute 161 deploys. Once the parachute 161 is fully opened, and the mission aircraft 120 has been captured by engaging the first capture device 123 with the capture line 116, the tension device 134 continues to reel in the capture line 116, against the drag force provided by the parachute 161. Accordingly, the mission aircraft 120 descends in a relatively slow, controlled manner.

Figure 1D:
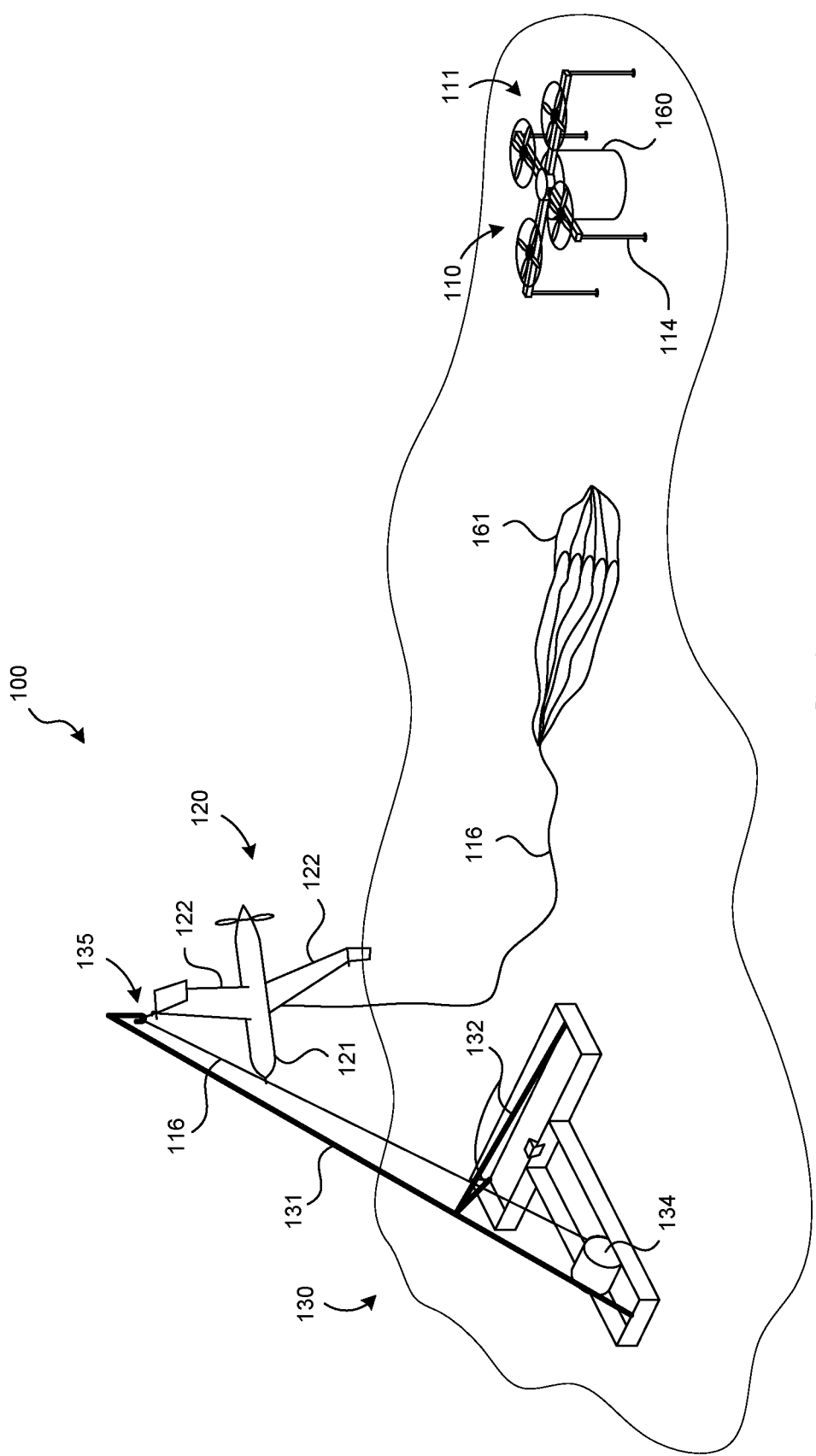
FIG. 1D is a partially schematic illustration of the system shown in FIG. 1A with the lift device and mission aircraft landed, in accordance with embodiments of the present technology.

FIG. 1D illustrates the system 100 after the mission aircraft 120 has been brought to rest at the line control device 130. The parachute 161 collapses and comes to rest on the ground (or other surface, e.g., a ship deck), or hangs suspended from the line support element 135. The lift device 110 also returns to the ground (or other surface), landing with the canister 160 intact and ready to be reloaded with the parachute 161 for the next operation.

Figure 2A:
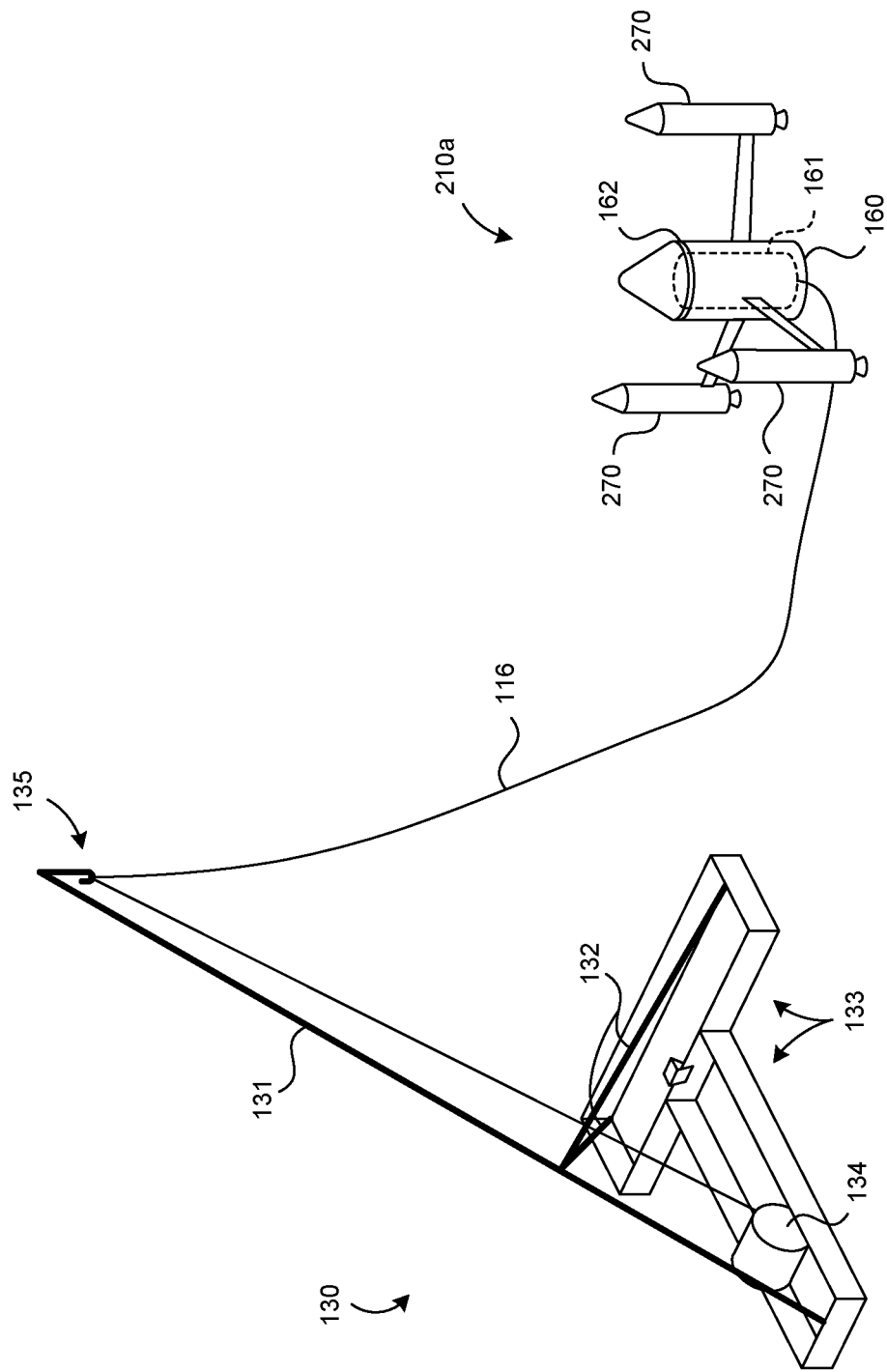
FIG. 2A is a partially schematic illustration of a lift device that includes one or more rockets in accordance with embodiments of the present technology.

The second aircraft 111 described above with reference to FIGS. 1A-1D represents one type of lift device that can be used to elevate and deploy the parachute 161 used to support the capture line 116. In other embodiments, the system can include lift devices having other configurations. For example, FIG. 2A illustrates a lift device 210a that includes one or more rockets 270 attached to the canister 160 in which the parachute 161 is positioned. The rockets 270 can include relatively small, solid propellant rockets that elevate the canister 160 to a suitable altitude at which the parachute 161 deploys. The parachute 161 can deploy when the altitude of the lift device 201a exceeds the length of the deployed capture line 116, with or without assistance from the extraction device 162, and/or by reeling in the tension device 134, as discussed above. The elapsed time between launching the rocket or rockets 270 and deploying the parachute 161 is relatively short. Accordingly, the rockets 270 will be launched shortly before the mission aircraft 120 (FIG. 1A) is at the end of its mission. This is unlike the second aircraft 111 described above with reference to FIGS. 1A-1D, which can loiter for some period of time before deploying the parachute it carries.

Figure 2B:
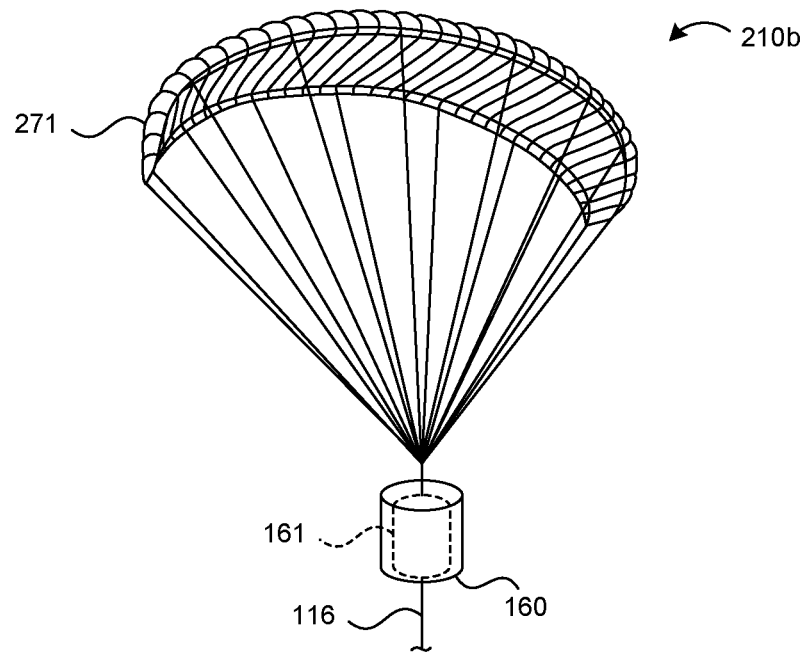
FIGS. 2B and 2C illustrate lift devices that include a kite (FIG. 2B) and a balloon (FIG. 2C), in accordance with embodiments of the present technology.

In still further embodiments, the lift device can have other configurations. For example, FIG. 2B illustrates a lift device 210b having the form of a kite 271 that carries the canister 160, parachute 161, and capture line 116 aloft. The kite 271 can have a parasail-type configuration, or another suitable configuration, and the associated parachute 161 can be deployed in accordance with any of the methods described above.

Figure 2C:
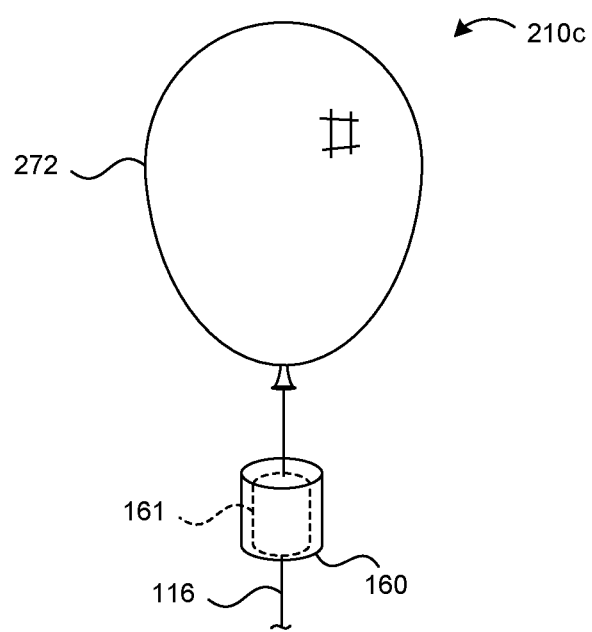

FIG. 2C illustrates a lift device 210c that includes a balloon 272 filled with helium or another lighter-than-ambient-air gas (e.g., hot air). The balloon 272 can be positioned aloft and can remain on station for a period of time before the parachute 161 is deployed from the canister 160, using any of the techniques described above.

Figure 3A:
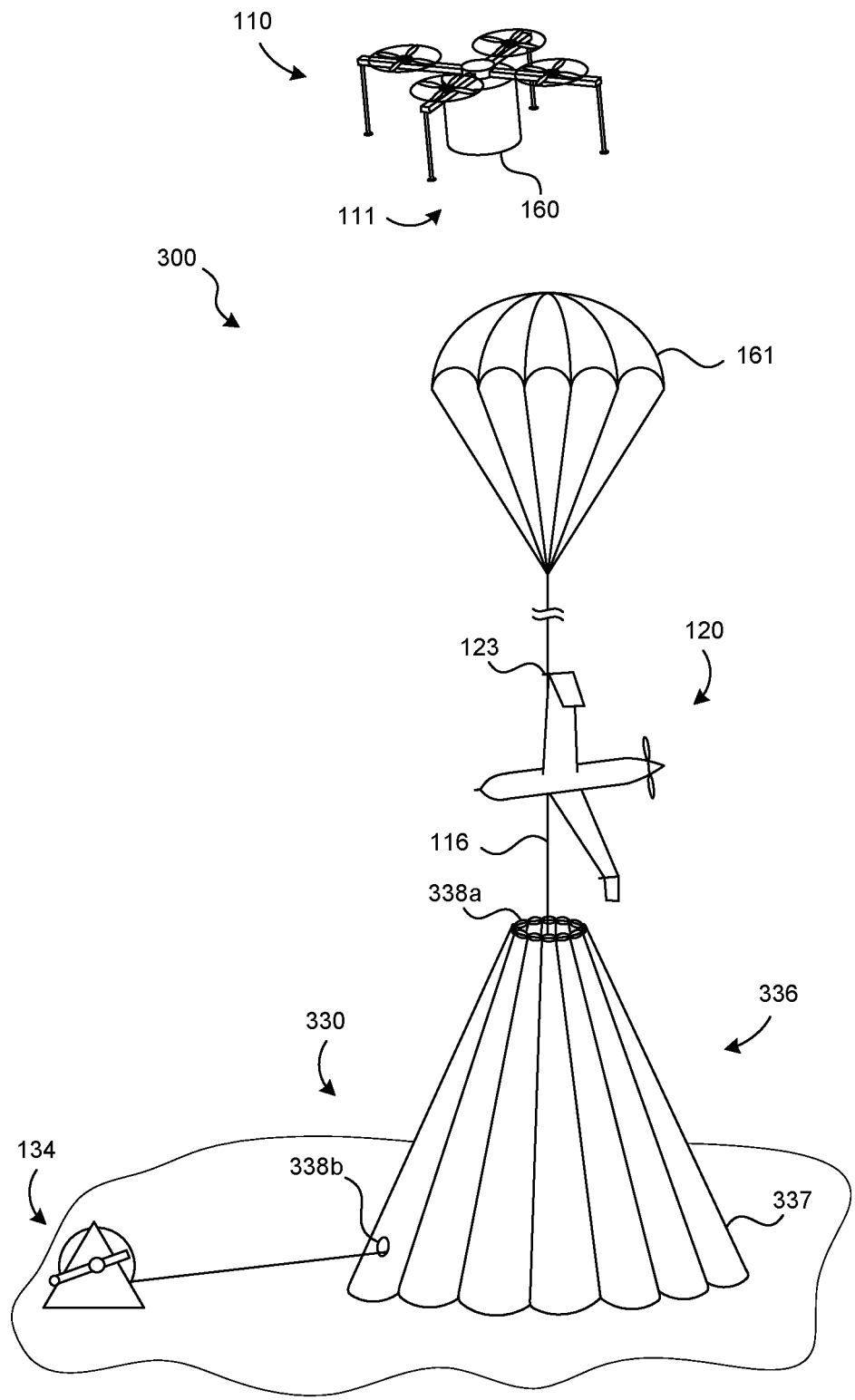
FIG. 3A is a partially schematic illustration of a system that includes a landing structure configured in accordance with embodiments of the present technology.

FIG. 3A illustrates a system 300 having several elements similar to corresponding elements described above, as well as a line control device 330 that includes a landing structure 336. The landing structure 336 can include an inflatable or otherwise collapsible device 337, e.g., having a generally cone-shaped outer surface. The exterior of the landing structure 336 can be formed from a heavy-duty plastic or other suitable material that is airtight, compliant, and resilient, so as to cushion the impact with the mission aircraft 120, without being punctured by the impact. The capture line 116 can pass through first and second apertures 338a, 338b in the landing structure 336 to connect to the tension device 134. The parachute 161 can be deployed from the canister 160 carried by the lift device 110, in accordance with any techniques described above.

Figure 3B:
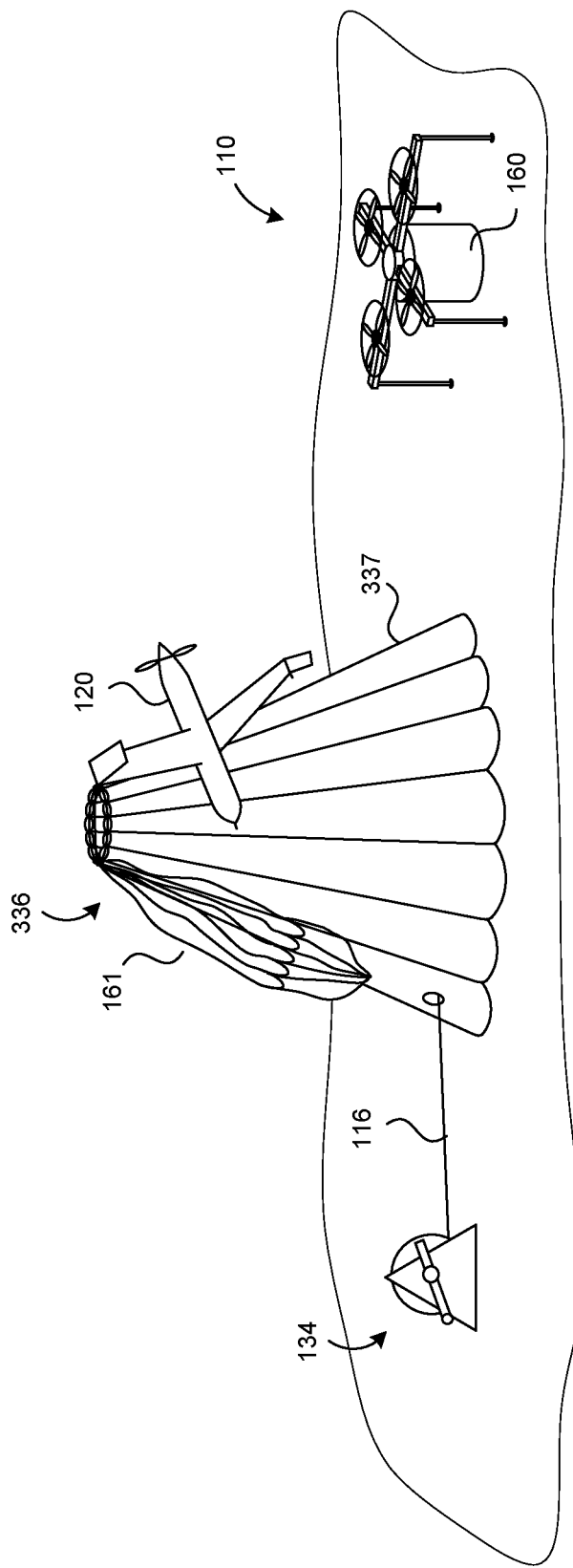
FIG. 3B is a partially schematic illustration of the system of FIG. 3A, with a mission aircraft landed on a landing structure in accordance with embodiments of the present technology.

Referring next to FIG. 3B, the tension device 134 has drawn the capture line 116 downwardly until the mission aircraft 120 has engaged the landing structure 336. The flexible, resilient characteristics of the landing structure 336 pad the impact of the mission aircraft 120, and the conical shape can act to spread the impact forces. Once the mission aircraft 120 has come to rest, it can be disengaged from the capture line 116, and the parachute 161 can be restowed in the canister 160 for another mission.

Figure 4A:
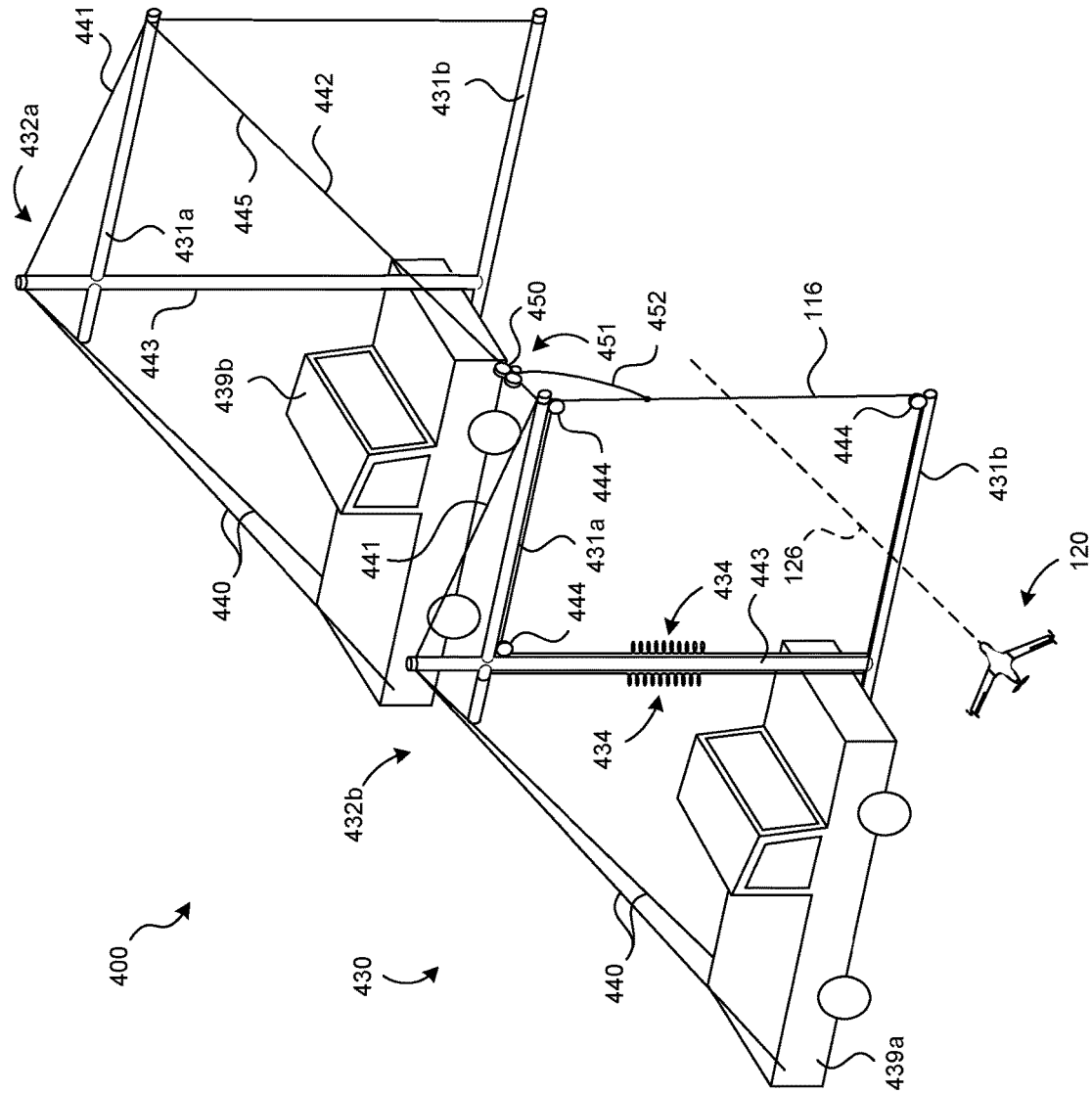
FIG. 4A is a partially schematic, isometric illustration of a system that includes a line control device supported by multiple vehicles in accordance with embodiments of the present technology.

FIG. 4A is a partially schematic illustration of a system 400 that may not include a parachute-assist for recovering the mission aircraft 120. Instead, the system 400 can include a line control device 430 that in turn includes a carriage 450 to which the capture line 116 is attached. The carriage 450 travels along a carriage track 445 after the mission aircraft 120 has engaged the capture line 116. The carriage track 445 can include a flexible line 442 that is held in position by one or more supports 432, e.g., two supports, shown as a first support 432a and a second support 432b. Each support 432 can include an upright portion 443, and one or more boom portions 431, illustrated as an upper boom portion 431a and a lower boom portion 431b. The upper boom portions 431a can be supported relative to the upright portion 443 with a guyline 441, and each upright portion 443 can be supported by a corresponding vehicle 439a, 439b. For example, each upright portion 443 can be supported relative to the corresponding vehicle 439a, 439b with one or more braces 440 providing for additional support. The vehicles 439a, 439b can include pickup trucks or other suitable utility vehicles in which the components of the system 400 can be stowed when not in use.

The carriage 450 can be coupled to the capture line 116 via a restraint device 451 that can in turn include a restraint line 452, and one or more tension devices 434. Once the mission aircraft 120 has engaged with the capture line 116, the impact drags the carriage 450 along the carriage track 445. The capture line 116 can pass over a series of pulleys 444, which are connected to the tension devices 434. Accordingly, the tension devices 434 provide a braking force on the capture line 116, the carriage 450, and the mission aircraft 120 until the mission aircraft 120 comes to rest, hanging from the capture line 116. A brake or other device can secure the carriage 450 in position toward the end of the carriage track 445 until the tension in the tension device 434 is controllably released and the mission aircraft 120 is removed.

Figure 4B:
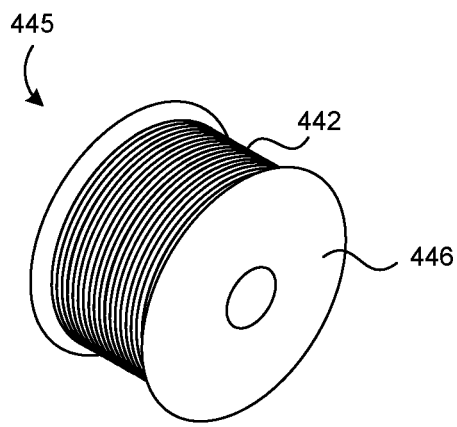
FIGS. 4B, 4C, and 4D illustrate representative carriage tracks for use with the system shown in FIG. 4A, in accordance with embodiments of the present technology.
Figure 4C:
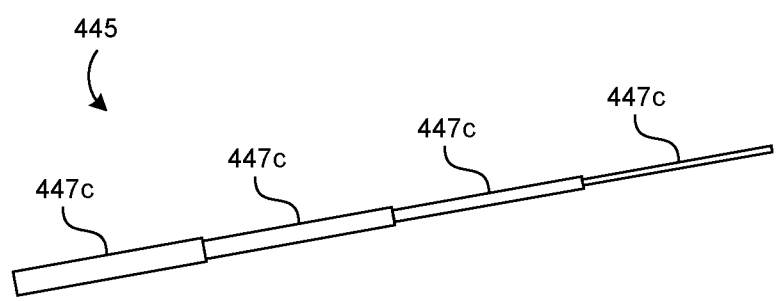
Figure 4D:
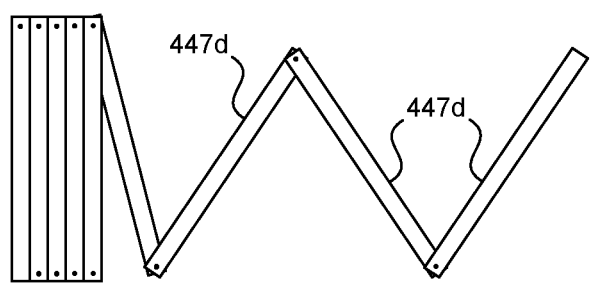

In an embodiment shown in FIG. 4A, the carriage track 445 includes a flexible line 442. FIG. 4B illustrates the flexible line 442 rolled up on a reel 446. Accordingly, the flexible line 442 can be easily stowed when not in use. In other embodiments, the carriage track 445 can have a rigid but collapsible configuration. For example, as shown in FIG. 4C, the carriage track 445 can be made from telescoping sections 447c, and as shown in FIG. 4D, the carriage track 445 can be made from folding sections 447d. In any of these embodiments, the system can be rapidly erected and taken down, and can be rapidly moved from one location to another via the vehicles 439a, 439b.

Figure 5D:
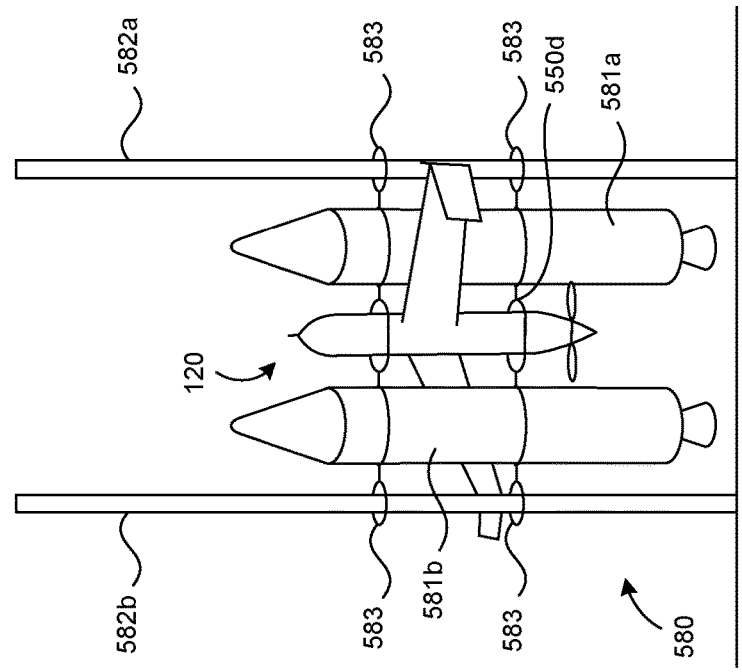
FIG. 5D is a partially schematic illustration of a system that includes multiple rockets for launching an aircraft, in accordance with embodiments of the present technology.

FIGS. 5A-5D schematically illustrate a system 500 that includes a launcher 580 and a parachute that is used to land an element of the launcher 580 rather than landing the mission aircraft 120. Referring first to FIG. 5A, the launcher 580 can include a rocket 581 having a carriage 550 that releasably supports the mission aircraft 120. The launcher 580 can further include a launch guide 582 that extends upwardly and engages with corresponding guide elements 583 carried by the rocket 581. During launch, the guide elements 583 slide along the launch guide 582 to properly orient the rocket 581 during launch.

Referring next to FIG. 5B, the rocket 581 has been launched, and the mission aircraft 120 has been released from the carriage 550. The mission aircraft 120 can be released from the carriage 550 at the apogee of the rocket trajectory, and can then perform a dive and recovery maneuver to gain sufficient airspeed to perform its mission.

Figure 5C:
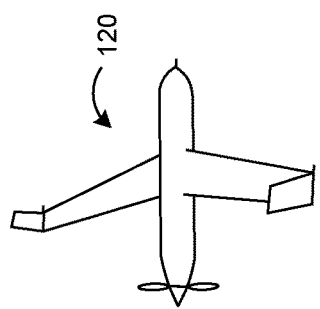
FIG. 5C is a partially schematic illustration of a process for retrieving the rocket shown in FIGS. 5A and 5B, in accordance with embodiments of the present technology.
Figure 5C:
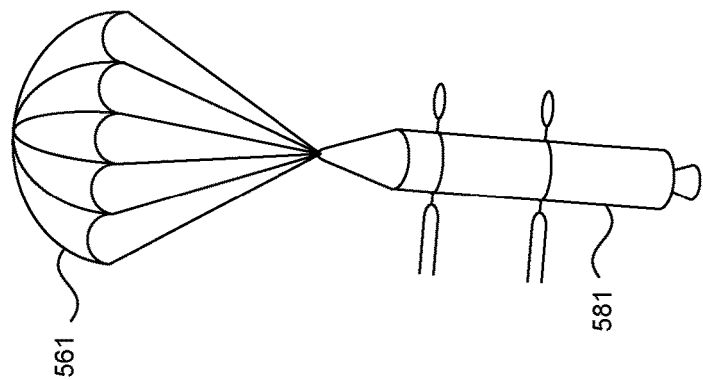

In FIG. 5C, the rocket 581 has deployed a parachute 561 so as to be reused for another mission. The mission aircraft 120 has attained level flight and has begun its mission.

FIG. 5D illustrates an embodiment in which the launcher 580 includes two rockets 581, shown as a first rocket 581a and a second rocket 581b, each of which includes guide elements 583 engaged with corresponding launch guides 582a, 582b and corresponding portions of a centrally-positioned carriage 550d. The multi-rocket configuration can provide increased stability and control when launching the mission aircraft 120. In an embodiment shown in FIG. 5D, the system 500 can include two rockets, and in other embodiments, the system can include other numbers of rockets, for example, three rockets arranged in the manner generally described above with reference to FIG. 2A.

Figure 6:
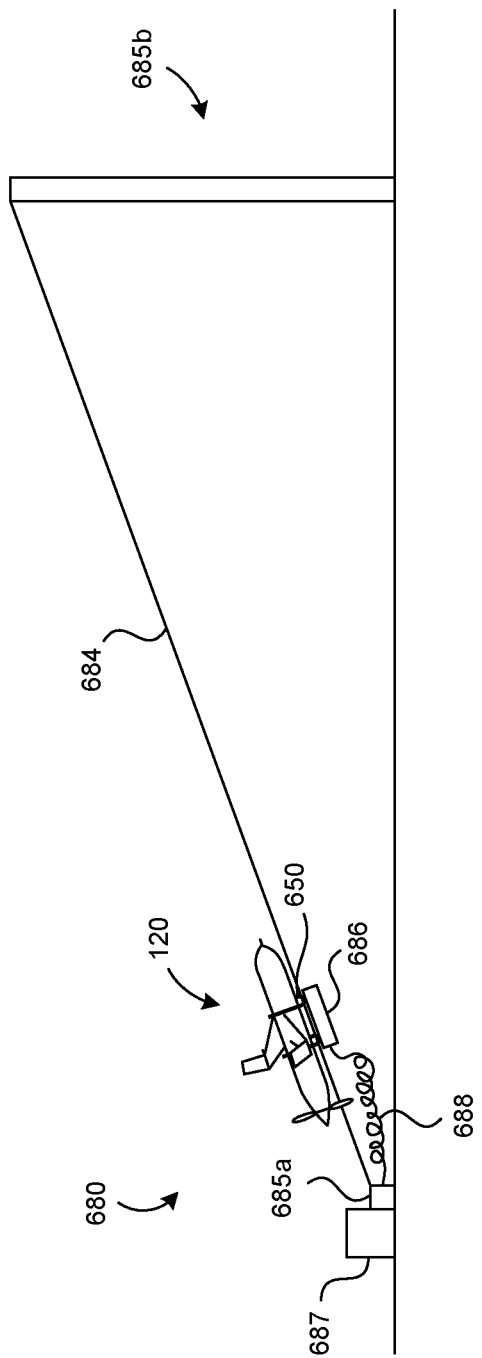
FIG. 6 is a partially schematic illustration of a launcher having a carriage track and carriage propelled in accordance with embodiments of the present technology.
Figure 7A:
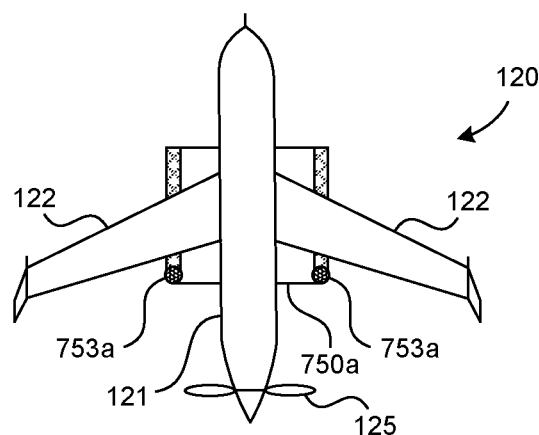
FIGS. 7A-7D illustrate representative techniques for carrying an aircraft with a carriage in accordance with embodiments of the present technology.
Figure 7B:
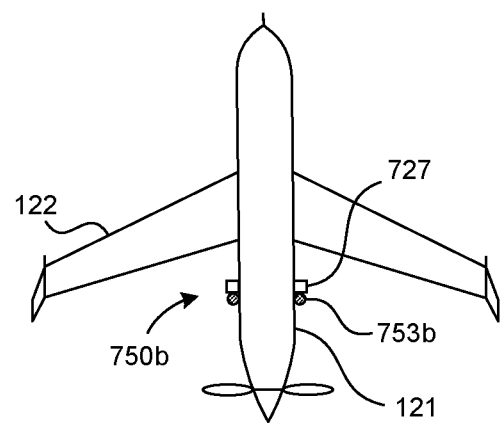
Figure 7C:
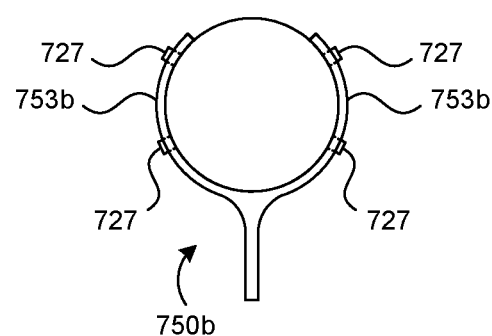
Figure 7D:
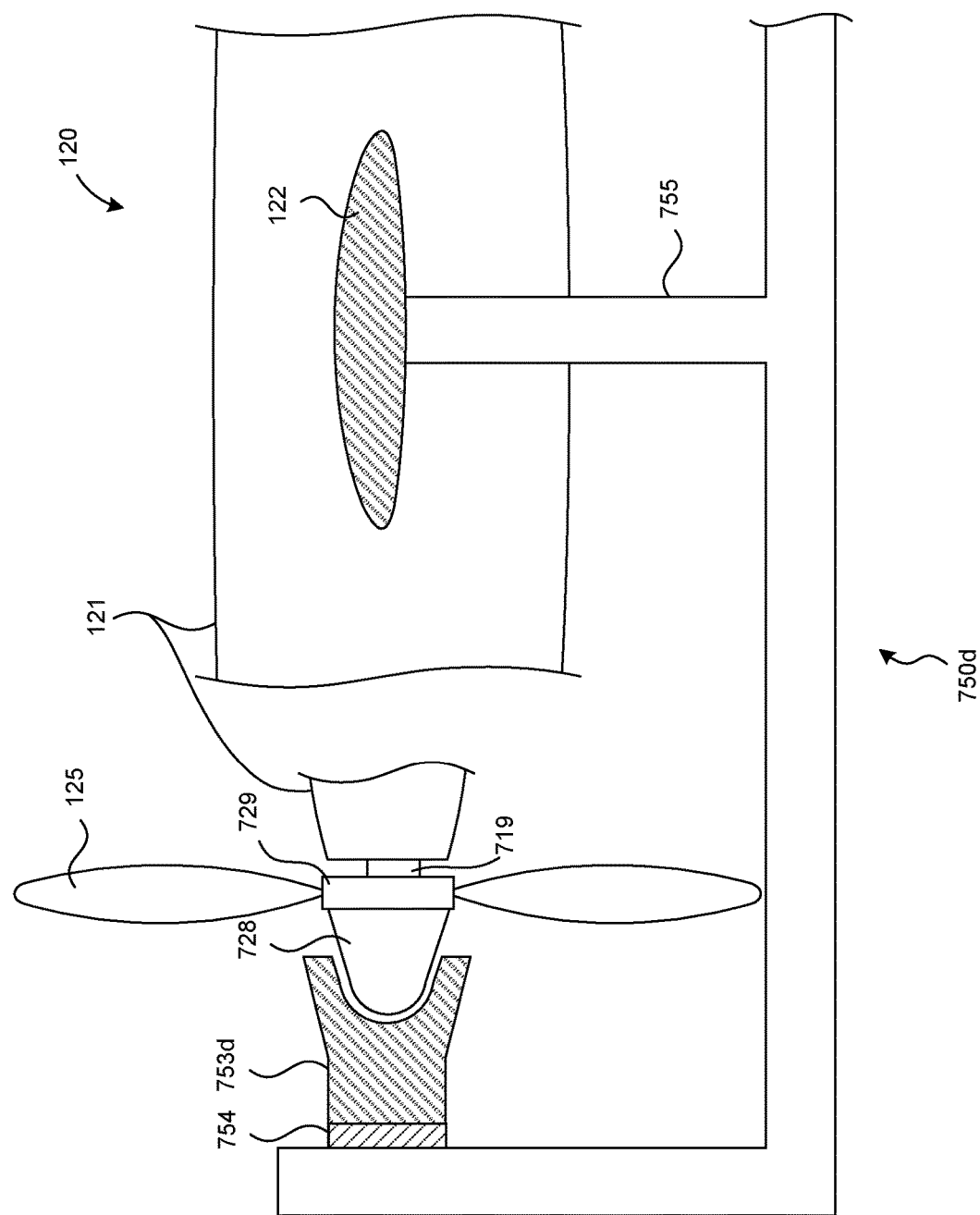
Figure 8:
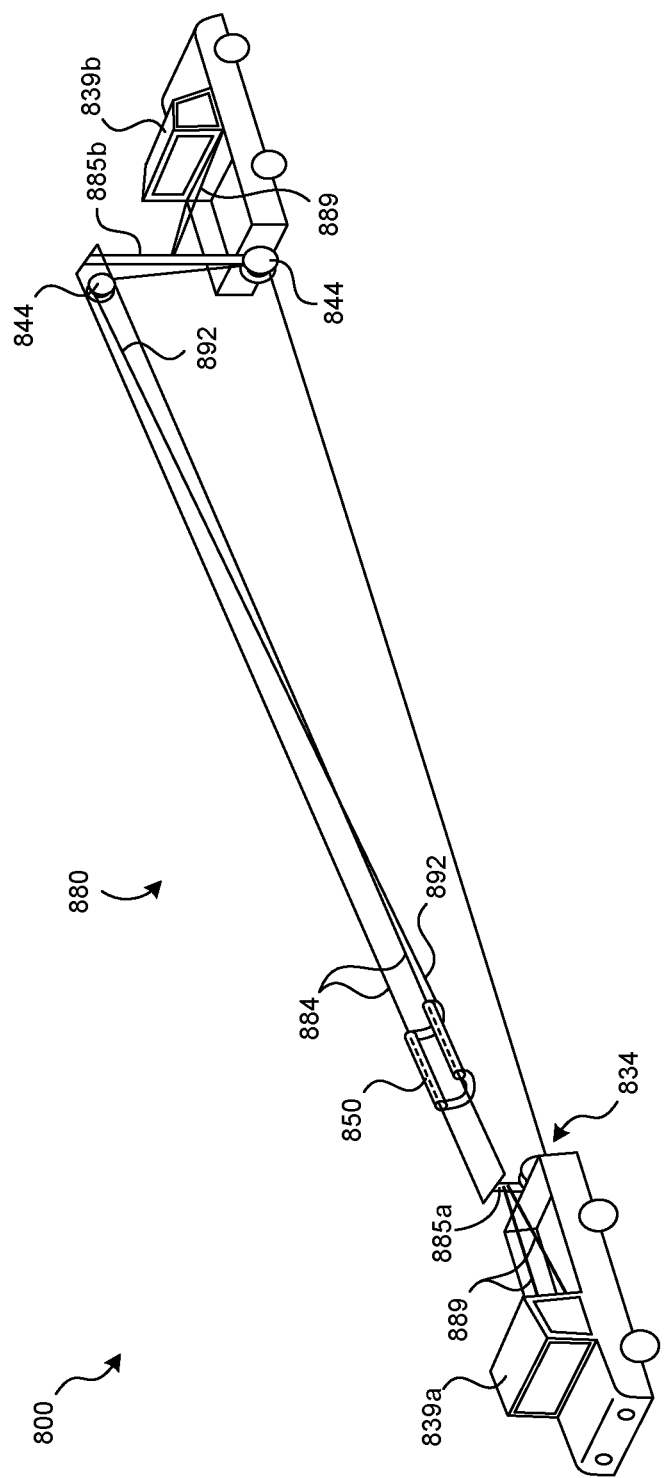
FIG. 8 is a partially schematic illustration of a launcher having a carriage track supported by multiple vehicles in accordance with embodiments of the present technology.

FIGS. 6-8 illustrate further representative systems for launching the mission aircraft 120, in accordance with embodiments of the present technology. FIG. 6 illustrates a launcher 680 that includes a carriage track 684 carried between first and second supports 685a, 685b. A corresponding carriage 650 carries the mission aircraft 120 and is coupled to a carriage driver 686. The carriage driver 686 propels the carriage 650 along the carriage track 684. The carriage 650 rapidly decelerates at the end of the carriage track 684, and the mission aircraft 120 is released from the carriage 650 for flight.

The carriage driver 686 can propel the carriage 650 along the carriage track 684 using any of a variety of suitable techniques. For example, the carriage driver 686 can be filled with compressed gas or liquid, which is directed aft to accelerate the carriage 650 in a forward direction. In some embodiments, the carriage driver 686 can be made smaller by supplying it with additional propellant from a fixed, ground-based propellant source 687 coupled to the carriage driver 686 with a propellant supply line 688. For example, the propellant source 687 and supply line 688 can supply the carriage driver 686 with enough compressed gas and/or liquid to accelerate the carriage 650 to the target lift-off speed (of the mission aircraft 120) at the end of the carriage track 684.

In other embodiments, the carriage driver 686 can include a chemical propellant, for example, a rocket engine that propels the carriage 650 along the carriage track 684. In still further embodiments, the carriage driver 686 can be propelled using a mechanical device, for example, a spring or bungee, that can be connected to the first support 685a, and that can take the place of the propellant supply line 688 to accelerate the carriage 650 along the carriage track 684.

In any of the foregoing embodiments, the carriage 650 supports the mission aircraft 120 during its acceleration, and is positioned and configured to release the mission aircraft at the end of its acceleration run. FIGS. 7A-7D are partially schematic illustrations of representative carriages configured to carry out this operation.

Beginning with FIG. 7A, a representative carriage 750a includes multiple upwardly extending engagement portions 753a that engage with the trailing edge of the mission aircraft wings 122. The engagement portions 753a are spaced apart by a distance at least as great as the diameter of the propeller 125 so that, upon release, the propeller 125 passes between the engagement portions 753a as the mission aircraft 120 is released for flight.

FIGS. 7B and 7C illustrate a portion of another carriage 750b configured to engage with the fuselage 121 of the mission aircraft 120. The fuselage 121 can include fuselage engagement portions 727 that extend outwardly from the main outer mold line of the fuselage 121. The carriage 750b can include corresponding carriage engagement portions 753b that engage with the rearward facing surfaces of the fuselage engagement portions 727. Accordingly, the carriage 750b pushes on the fuselage 121 to accelerate it, and allows the mission aircraft 120 to release in a forward direction for flight. In a particular aspect of this embodiment, the carriage engagement portions 753b fold down (e.g., in a forward direction) as the mission aircraft is released, so as not to interfere with the propeller 125 as it passes by.

FIG. 7D illustrates another representative carriage 750d configured to engage with the propeller 125 of the mission aircraft 120. In one aspect of this embodiment, the propeller 125 is attached to a hub 729 that is rotated relative to the fuselage 121 via a drive shaft 719. A rearward facing spinner 728 projects rearwardly from the propeller 125 and can be releasably engaged with a carriage engagement portion 753d supported in position by the carriage 750d. An intermediate bearing 754 allows the carriage engagement portion 753d to rotate with the propeller 125 relative to the carriage 750d during the carriage acceleration run. Additional supports 755 engage the wings 122 of the mission aircraft 120 to support its weight. The supports 755 are located far enough outboard along the wings 122 so as not to interfere with the propeller 125 as it passes by. When the carriage 750d is brought to a halt, the mission aircraft 120 continues to travel forwardly, with the spinner 728 disengaging from the carriage engagement portion 753d, and with the wings 122 lifting off the supports 755.

FIG. 8 illustrates another representative system 800 that includes a launcher 880 supported by two vehicles 839, shown as a first vehicle 839a, and a second vehicle 839b. Each vehicle can carry a corresponding support, shown as a first support 885a and a second support 885b. A carriage track 884 is carried between the first and second supports 885a, 885b. The carriage track 884 can include a pair of flexible lines, each generally similar to the line discussed above with reference to FIGS. 4A and 4B, or a rigid, but collapsible, structure, as described above with reference to FIGS. 4C and 4D. In any of these embodiments, a corresponding carriage 850 (shown schematically in FIG. 8) is positioned to slide along the carriage track 884 and is connected to a driveline 892. The driveline 892 can be connected to a tension device 834 (e.g., a winch) and can be guided via one or more guide pulleys 844. The carriage track 884 can remain in tension as a result of the weights of the respective vehicles 839a, 839b, with the supports held in position via corresponding braces 889. In other embodiments, the first and/or the second vehicle 839a, 839b can be placed in "drive" so as to increase the tension on the carriage track 884. In further embodiments, a block and tackle, or other suitable device, can be used to provide a mechanical advantage for accelerating the carriage 850, and/or the tension device 834 can include a spring, bungee, and/or other suitable device, in addition to or in lieu of a winch.

Figure 9A:
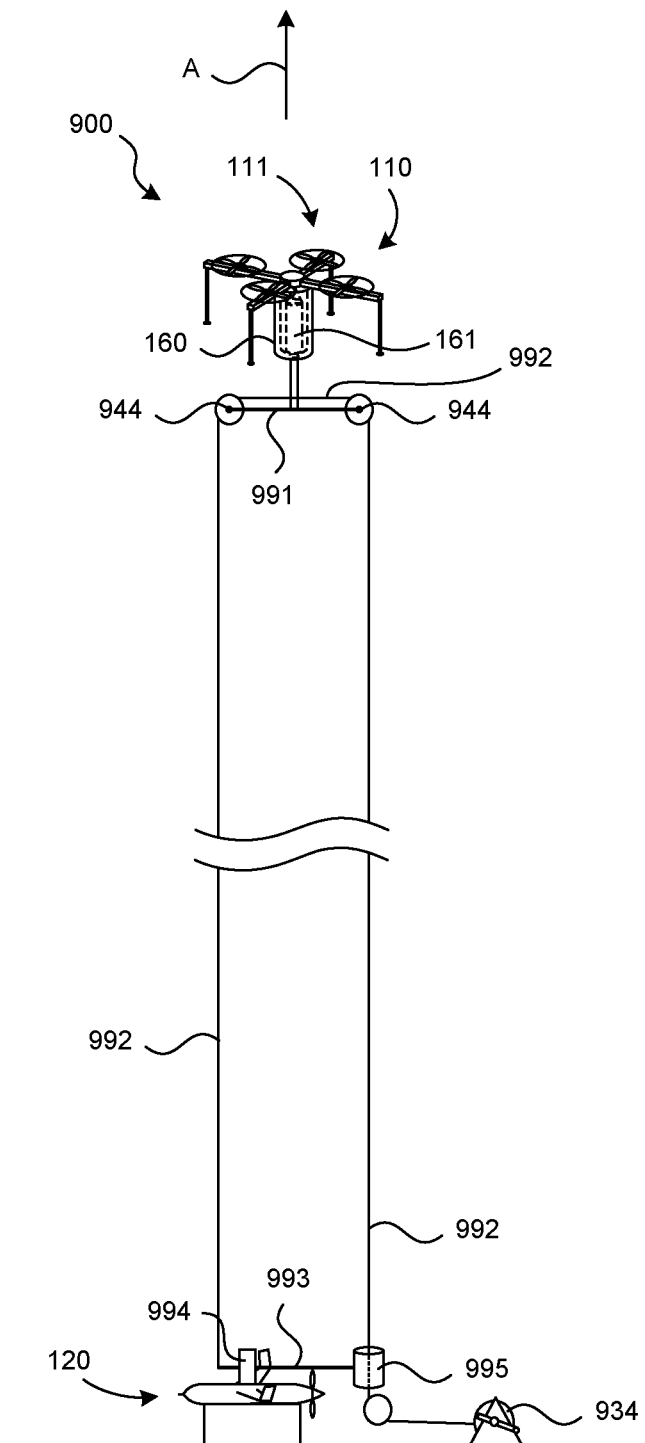
FIGS. 9A-9C illustrate a representative system configured to both launch and recover an aircraft, using a parachute, in accordance with embodiments of the present technology.

FIG. 9A illustrates a system 900 that includes common elements suitable for both launching and capturing the mission aircraft 120, in accordance with embodiments of the present technology. The system 900 can include a lift line/capture line 992 that can operate to lift the mission aircraft 120 and, optionally, capture the mission aircraft 120. The line 992 is initially attached to the mission aircraft 120 via an attachment/release device 994, and passes over pulleys 944 carried by a pulley support 991. The two pulleys 944 are spaced apart from each other so as to avoid contact between the portions of the line 992 passing over each pulley. To further avoid such contact, the system can include a spreader 993 connected between the attachment/release device 994 and a slide guide 995 (e.g., an open-ended cylinder through which the line 992 passes). In at least some arrangements, the spreader 993, the attachment/release device 994, and the slide guide 995 form a unitary structure. The line 992 is attached to a tension device 934 (e.g., a winch).

To initiate the launch operation, the lift device 110 lifts the pulley support 991 while the mission aircraft 120 remains in a generally fixed position on or near the ground. As the lift device 110 ascends, the tension device 934 unspools the line 992, allowing the lift device 110 to gain altitude, while the slide guide 995 allows the unwinding line 992 to pass upwardly around the pulleys 944.

Figure 9B:
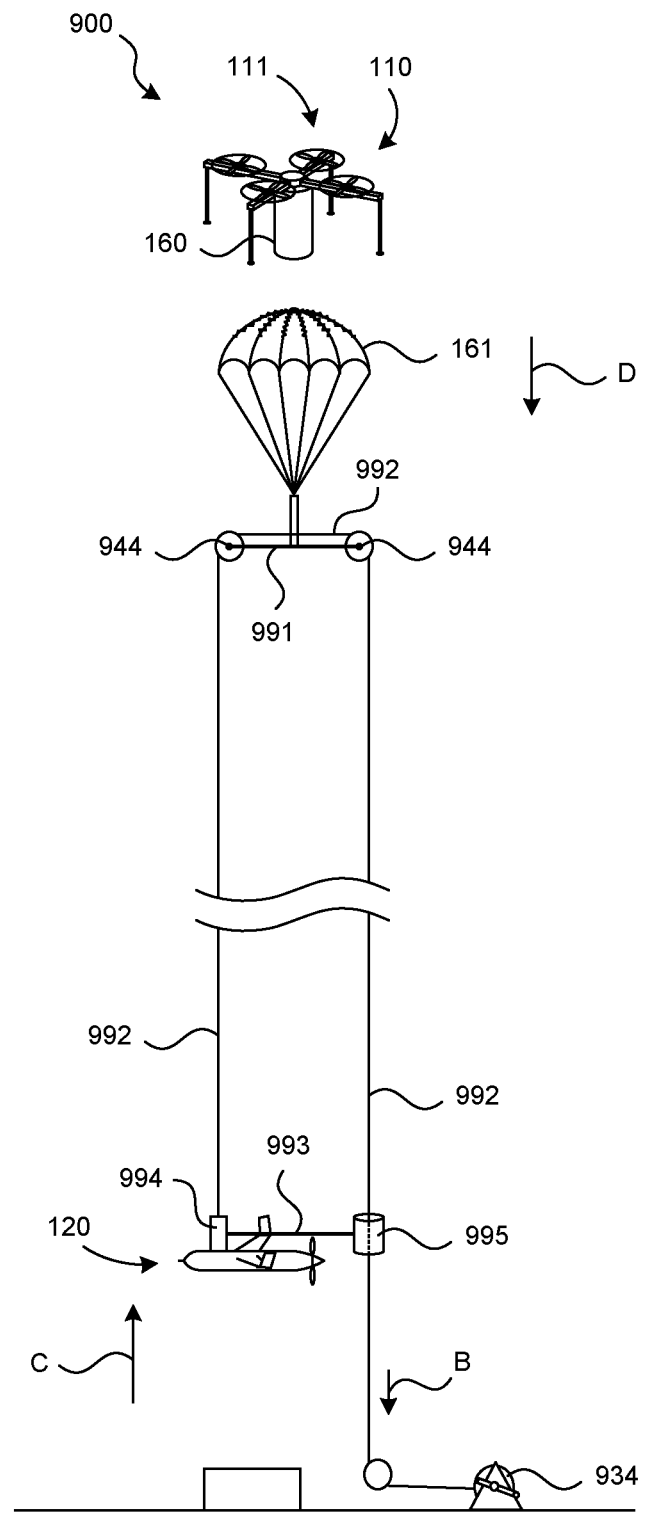

As shown in FIG. 9B, when the lift device 110 achieves a suitable altitude, the parachute 161 is deployed from the cannister 160, for example, using any of the techniques described above. The pulley support 991 begins to descend, under the braking force supplied by the parachute 161, as indicated by arrow D. The tension device 934 is activated, to rapidly draw in the line 992, as indicated by arrow B. In particular, the rate at which line 992 is drawn in is greater than the rate at which the pulley support 991 descends. As a result, the mission aircraft 120 begins to ascend, as indicated by arrow C.

In a representative embodiment, the tension device 934 can reel in the lift line/capture line 992 at a rate two or three times greater than the descent rate of the pulley support 991, causing the mission aircraft 120 to gain sufficient altitude for launch. Accordingly, the parachute 161 is deployed at an altitude significantly greater than the altitude at which the mission aircraft 120 is to be released. For example, if the mission aircraft 120 is to be released at an altitude of 200 feet, and the tension device 934 draws in the line 992 at three times the rate of descent of the pulley support 991, then the parachute 161 is deployed at an altitude of at least 600 feet. In other embodiments, other altitudes and winch-in rates can be used, depending on factors that include the target release altitude for the mission aircraft 120, the weight of the pulley support 991 and associated line 992, and the braking force applied by the parachute 161.

Figure 9C:
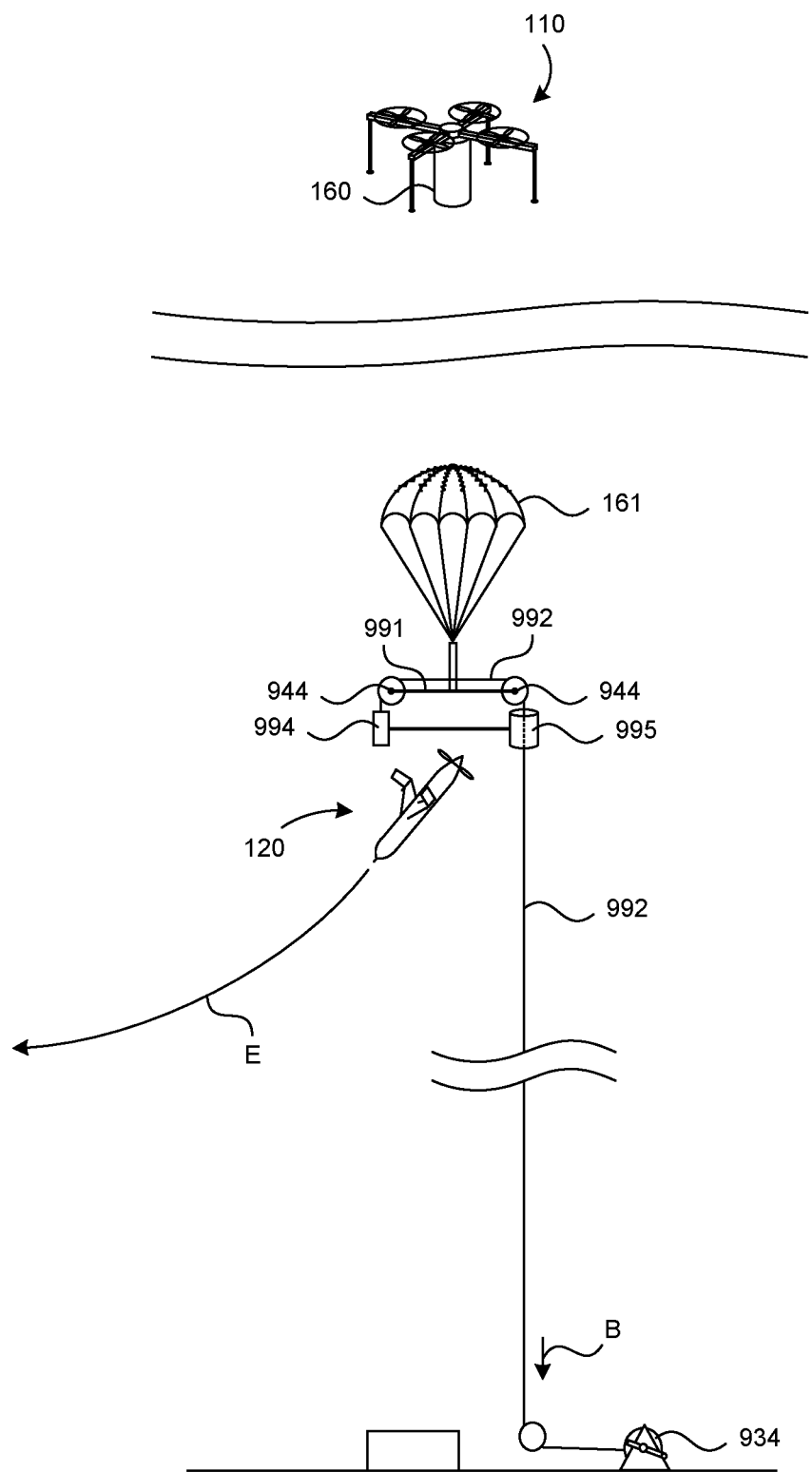

Referring next to FIG. 9C, the parachute 161 and pulley support 991 have descended from the lift device 110, and the mission aircraft 120 has been elevated as a result of the differential between the rate at which the line 992 is taken up by the tension device 934, and the descent rate of the parachute 161. At this point, the mission aircraft 120 can be released from the attachment/release device 994. The mission aircraft 120 then dives, recovers, and flies its mission, as indicated by arrow E. The pulley support 991 continues its descent under the braking force of the parachute 161, and the tension device 934 can simply reel in the resulting slack, or can actively pull on the pulley support 991 and the parachute 161 to increase the descent rate.

To perform the recovery operation, in accordance with some embodiments, the pulley support 991, the spreader 993, and the slide guide 995 can be removed, and the attachment/release device 994 can be attached directly to the parachute 161, which is re-packaged into the canister 160. When the mission aircraft 120 nears the end of its mission, the lift device 110 lifts the line 992, which is now used as a capture line. The capture operation is then conducted in a manner generally similar to that described above with reference to FIGS. 1A-3B, using any of the ground-based line control devices or recovery devices described above. If the spreader 993, the slide guide 995 and the attach/release device 994 are manufactured as a unitary element, the entire element can be removed, and the line 992 can be attached to the parachute 161 via a separate attachment device.

As described above, the same line 992 can be used for both launch and capture. In other embodiments, a different line can be used for each operation, with the lines being swapped out while the mission aircraft 120 conducts its mission. The two lines can be the same (e.g., for enhanced commonality) or different (e.g., if the loads and/or other requirements for the line differ significantly between launch and capture). In one aspect of the operation described above, the hardware attached to the line 992 is changed between the launch and recovery operations. In other embodiments, the operator uses different sets of hardware, one for launch and one for capture, but uses the same lift device 110 for both operations. The operator can also use the same tension device 934 in some embodiments, or a different tension device in other embodiments. Accordingly, the degree to which elements are used for both launch and capture can be selected depending on factors that may include the characteristics of the mission aircraft 120, the lift device 110, the line 992 and/or the tension device 934.

Figure 10A:
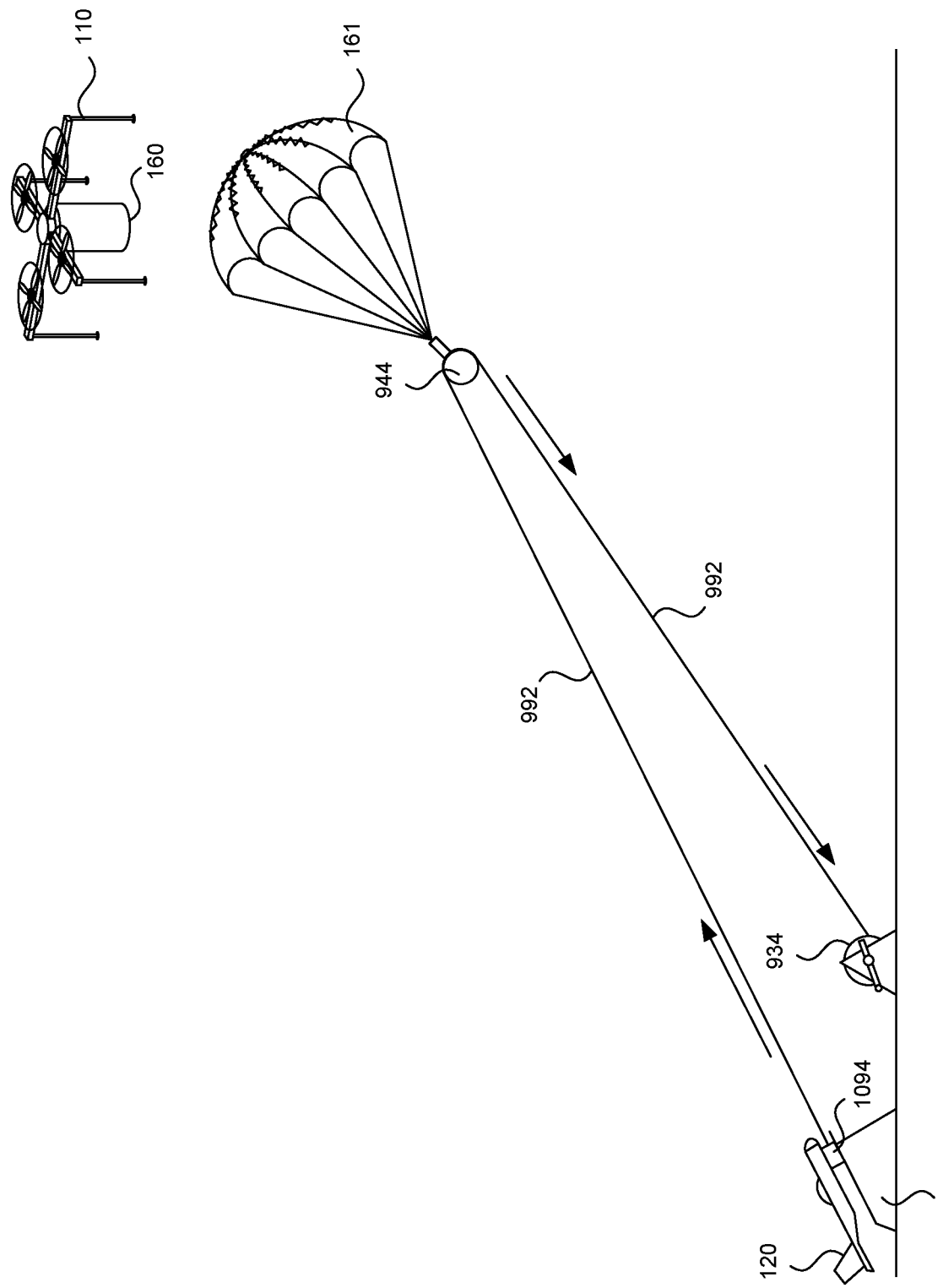
FIGS. 10A-10C illustrate another representative system for launching an aircraft using a parachute, in accordance with embodiments of the present technology.
Figure 10B:
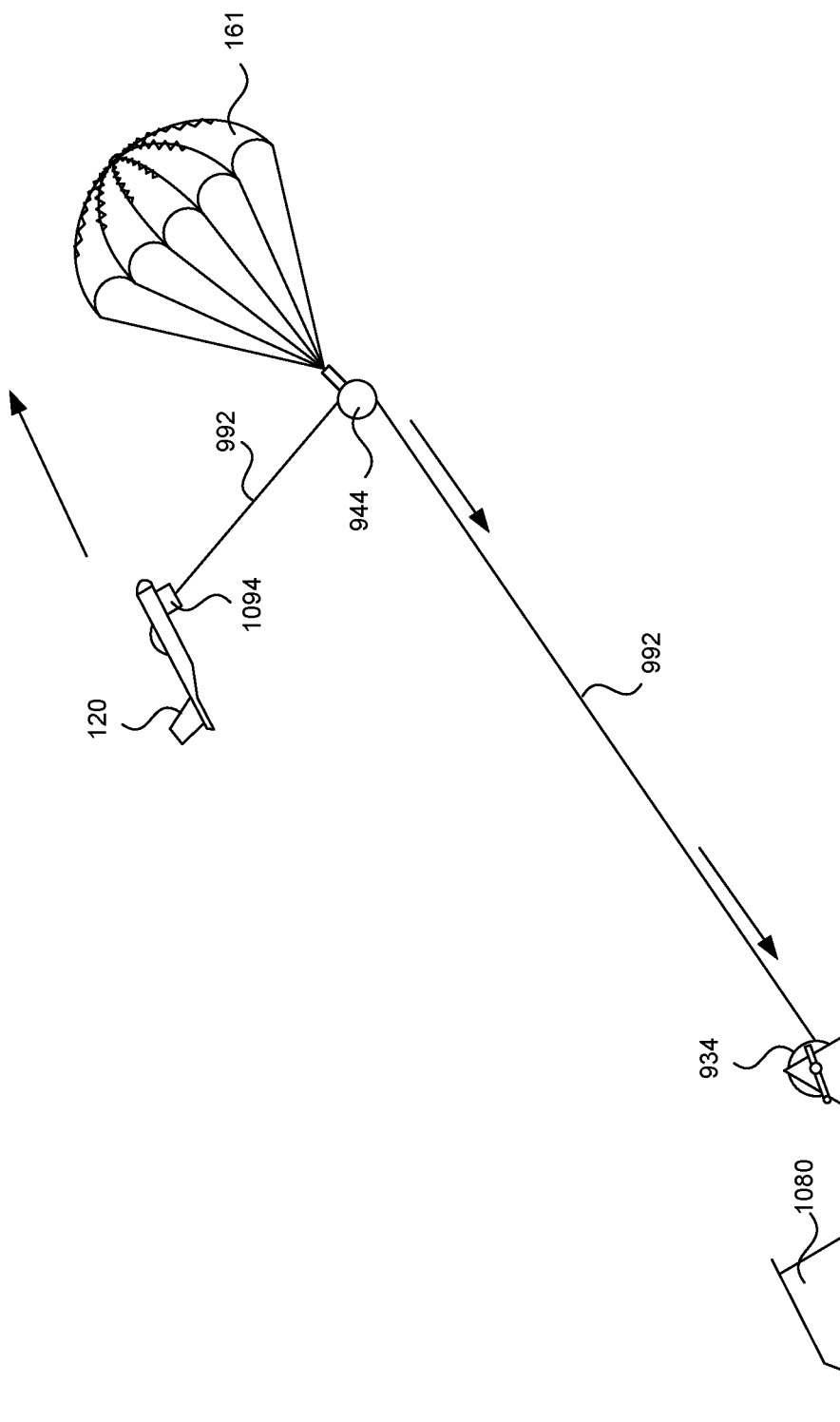

FIGS. 10A-10B are schematic illustrations of systems that include a ground- or ship-based launcher, with a parachute assist. Beginning with FIG. 10A, the system can include a launcher 1080 that releasably supports the mission aircraft 120. The mission aircraft 120 is coupled to a line 992 via a releasable attachment device 1094. The line 992 is wrapped around a pulley 944 and connected to a tension device 934 toward one end, and to a parachute 161 toward the other end.

The parachute 161 is initially packed inside the canister 160 carried by the lifting device 110.

In operation, the lifting device 110 carries the parachute 161, the pulley 944 and the line 992 to a target altitude, at which the parachute 161 is then deployed. The lifting device 110 can remain above the parachute 161 so as not to interfere with the launch operation. The tension device 934 rapidly draws in the line 992 at a rate significantly faster than the rate at which the pulley 944 and parachute 161 descend. Accordingly, the mission aircraft 120 accelerates off the launcher 1080 and into the air. As shown in FIG. 10B, the mission aircraft 120 has achieved suitable velocity for flight, and can be released by disengaging the releasable attachment device 1094. Although the mission aircraft 120 is shown in FIG. 10B relatively close to the parachute 161 prior to its release (for purposes of illustration), the line 992 can be sufficiently long that the mission aircraft 120 achieves a velocity suitable for flight well before it approaches the parachute 161, thus reducing or eliminating the likelihood for contact between the mission aircraft 120 and the parachute 120. Also, as noted above, the relative sizes of the system components may be different than those shown in the Figures. For example, the lifting device 110 may be significantly smaller than the mission aircraft 120, and/or the parachute 161. For example, the lifting device 110 can include a quadcopter having a two-foot diameter, while the parachute 161 (when deployed) can have a twenty-foot diameter.

Figure 10C:
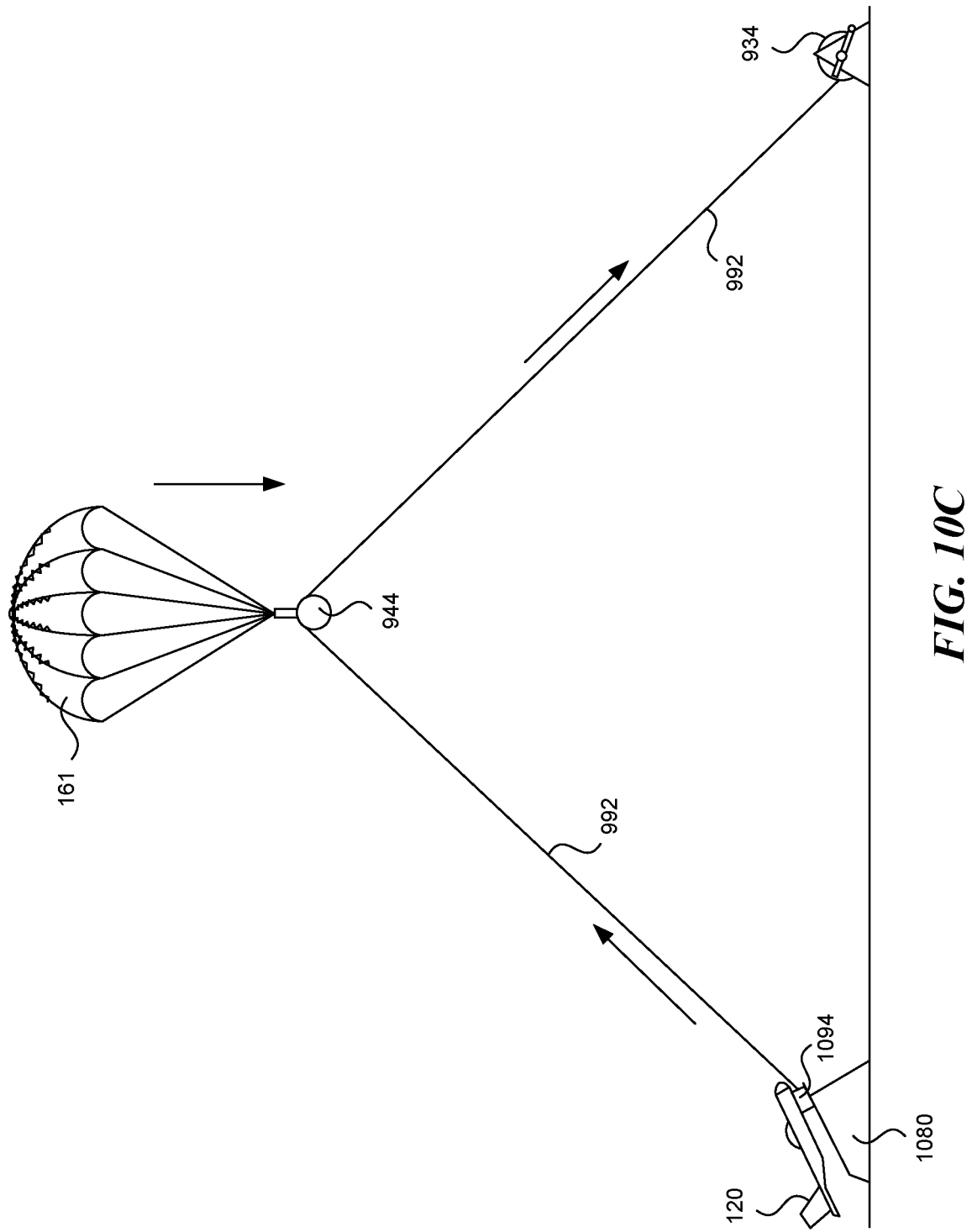

FIG. 10C illustrates another representative arrangement in which the system includes a tension device 934 that is spaced further apart from the launcher 1080 than is shown in FIGS. 10A and 10B. Overall, the operation of the system shown in FIG. 10C is similar to that described above with reference to FIGS. 10A and 10B; however, the load applied to the parachute 161 is expected to be reduced as a result of the increased spacing. As described above with reference to FIGS. 10A and 10B, in any of the embodiments shown in FIGS. 10A-10C, the aircraft can be released for its mission well before reaching the parachute 161 and the pulley 944, so as to avoid these elements (e.g., by flying under or around these elements).

Figure 11A:
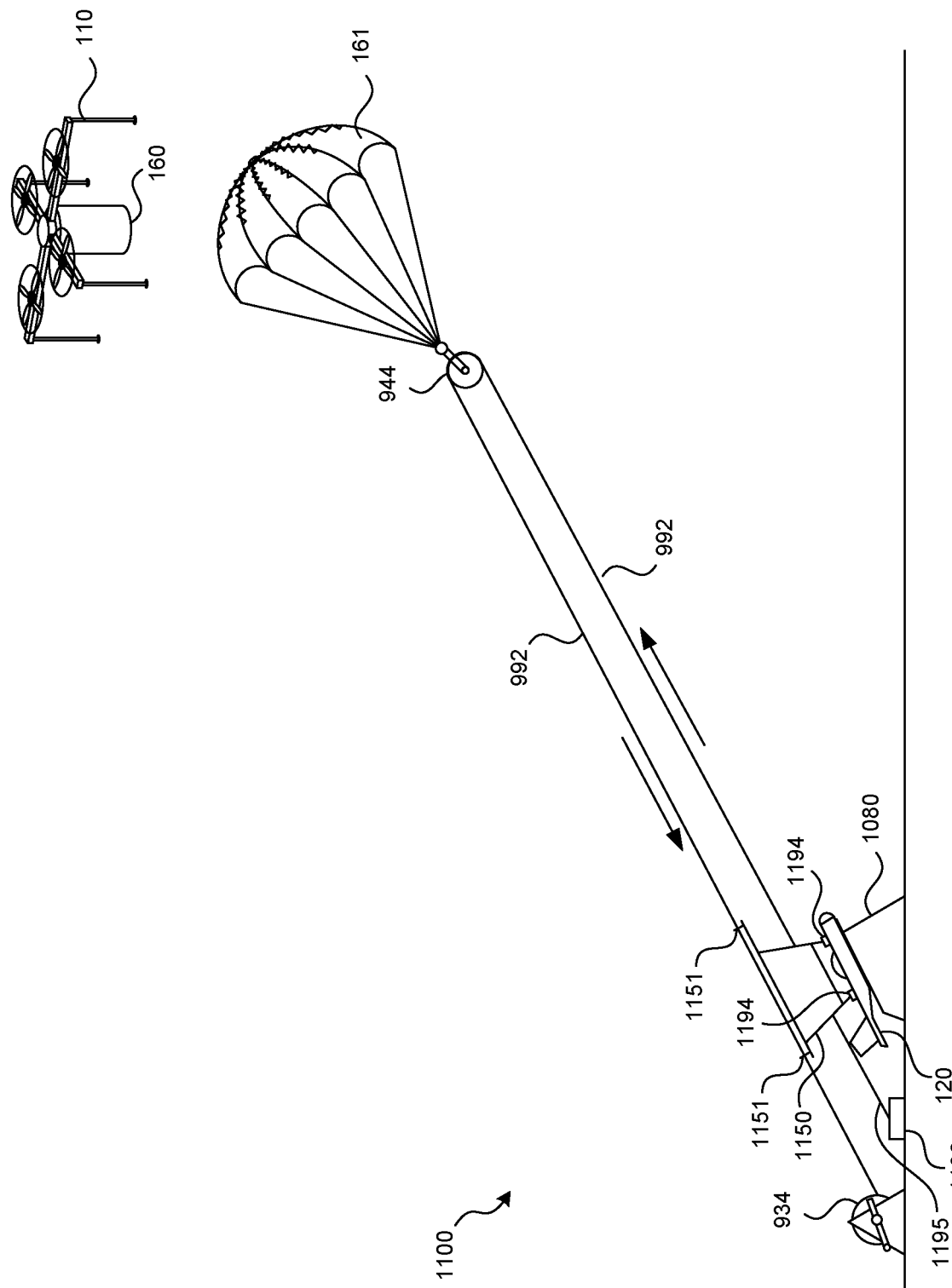
FIGS. 11A-11B illustrate still another representative system for launching an aircraft using a parachute, in accordance with embodiments of the present technology.
Figure 11B:
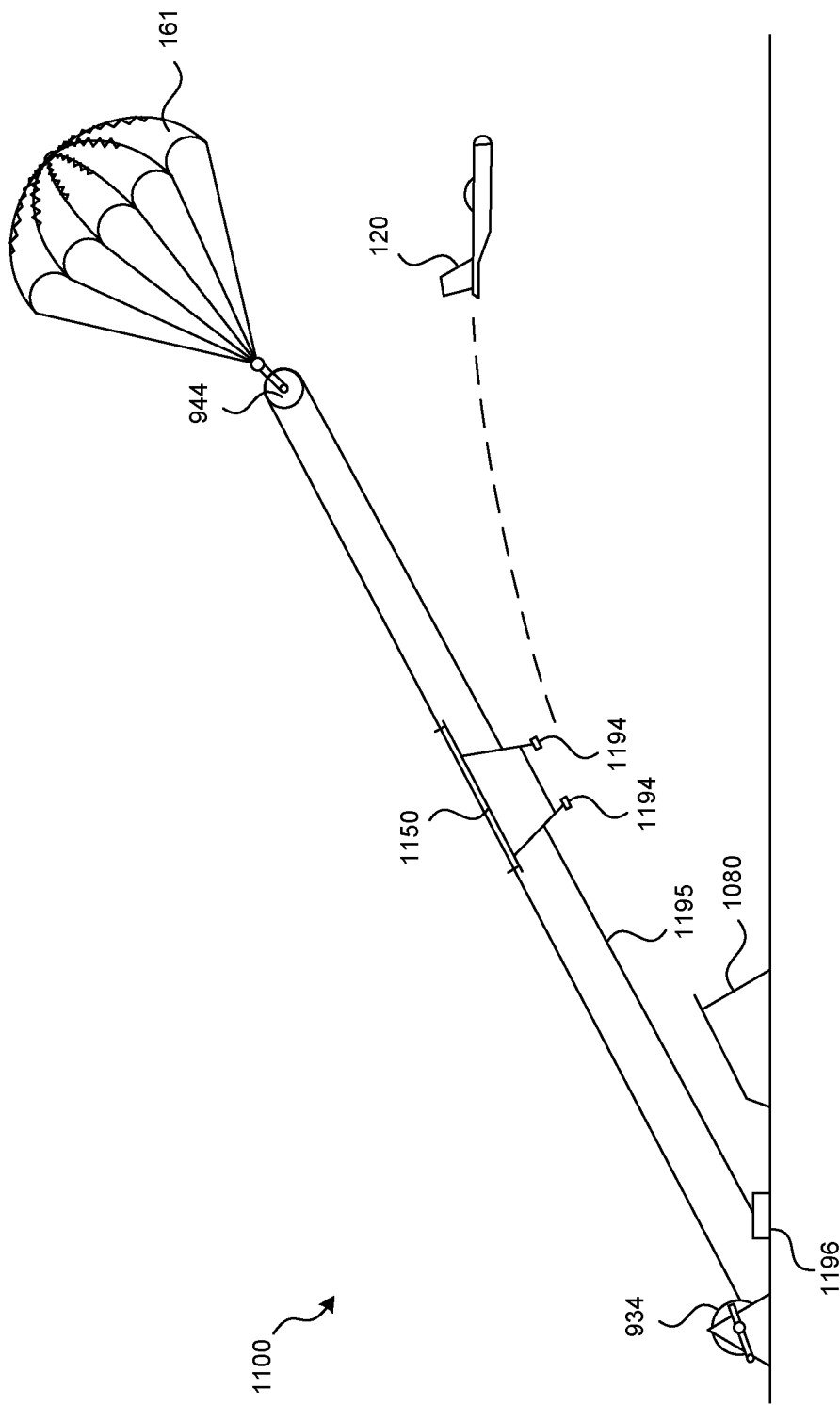

FIGS. 11A-11B illustrate another arrangement for lofting (e.g., launching) an aircraft, using a parachute, in which the aircraft passes beneath the parachute, rather than over the parachute, as shown in FIG. 10B. It is expected that in at least some embodiments, launching the aircraft to pass beneath the parachute will reduce the likelihood for interference between the aircraft and the parachute.

Beginning with FIG. 11A, a representative system 1100 can include a launcher 1080 from which the mission aircraft 120 is launched, and a carriage 1150 supported from and moveable along the line 992. The carriage 1150 can releasably carry the mission aircraft 120 via one or more releasable attachment devices 1194. In a representative system, two releasable attachment devices 1194 have gripper-type configurations. A release line 1195 is attached to the carriage 1150, and is coupled to a release line actuator 1196.

In operation, the lifting device 110 carries the parachute 161 in the canister 160, with the parachute attached to the pulley 944, around which the line 992 is positioned. Once the parachute 161 is released, the tension device 934 rapidly reels in the line 992, which pulls the carriage 1150 and the mission aircraft 120 off the launcher 1080. The line 992 passes through apertures 1151 in the carriage 1150 so that the carriage 1150 can move upwardly along the line 992 as it carries the mission aircraft 120 aloft.

Once the carriage 1150 achieves a suitable altitude, the mission aircraft 120 is released from the carriage 1150 via the releasable attachment devices 1194. For example, when the release line actuator 1196 is activated, e.g., to brake the release line 1195, the releasable attachment devices 1194 release the mission aircraft 120. The released mission aircraft 120 flies off, as indicated in FIG. 11B. The release line actuator 1196 can include one or more damping devices to reduce the impact on the overall system 1100 as the carriage 1150 is halted. Once the mission aircraft 120 is released, the parachute 161 can gently guide the carriage 1150 and pulley 944 to the ground, after which the system 1100 can be reloaded for the next aircraft launch.

Figure 12A:
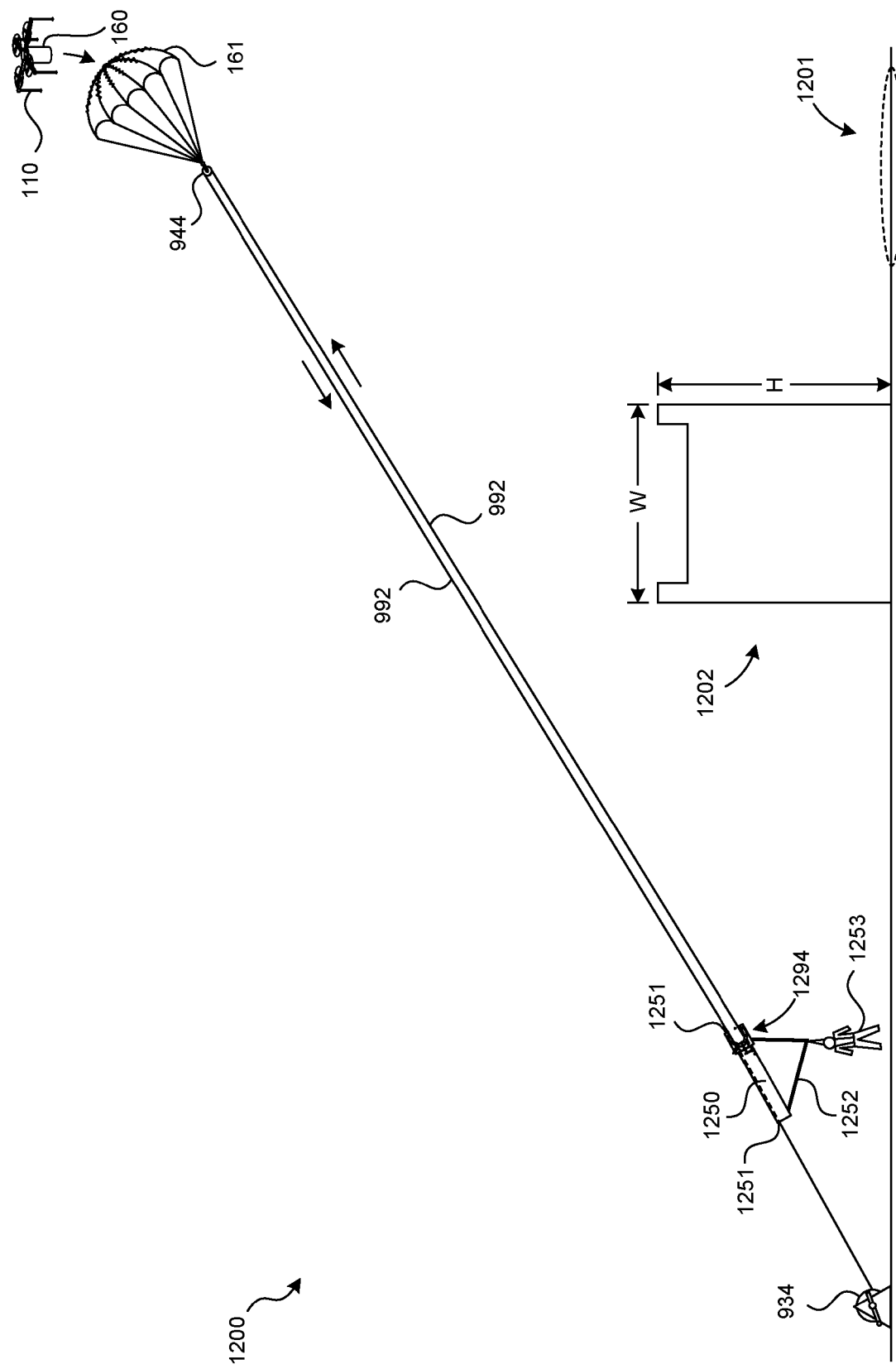
FIGS. 12A-12C illustrate a system for lofting a person or other payload over an obstruction, in accordance with embodiments of the present technology.

In other embodiments, generally similar systems can be used to loft personnel and/or other payloads upwardly, e.g., up and over an obstacle, in addition to, or in lieu of, lofting an aircraft in the manner described above with reference to FIGS. 10A-11B. For example, FIG. 12A illustrates a representative system 1200 that includes a line 992 coupled to a tension device 934 and carried aloft via a lifting device 110, generally in the manner described above. The lifting device 110 releases a parachute 161 and pulley 944 from a corresponding canister 160, also in a manner generally similar to that described above. The line 992 is attached to a carriage 1250, extends around the pulley 944, passes through apertures 1251 in the carriage 1250, and is attached to the tension device 934. A person 1253 is connected to the carriage 1250 via a harness 1252. The line 992 is attached to the carriage 1250 via a releasable attachment device 1294. In operation, the system 1200 can be deployed to hoist the person 1253 up and over an obstruction 1202 for a parachute-controlled landing at a landing zone 1201 on the opposite side. The obstruction 1202 can have a width W (e.g., 20 feet) and a height H (e.g., 50 feet). The length of the line 992, the altitude at which the parachute 161 is released (e.g., 500 feet above ground level, in some embodiments), and/or other factors, can be selected to account for obstructions 1202 having different widths W and/or heights H.

Figure 12B:
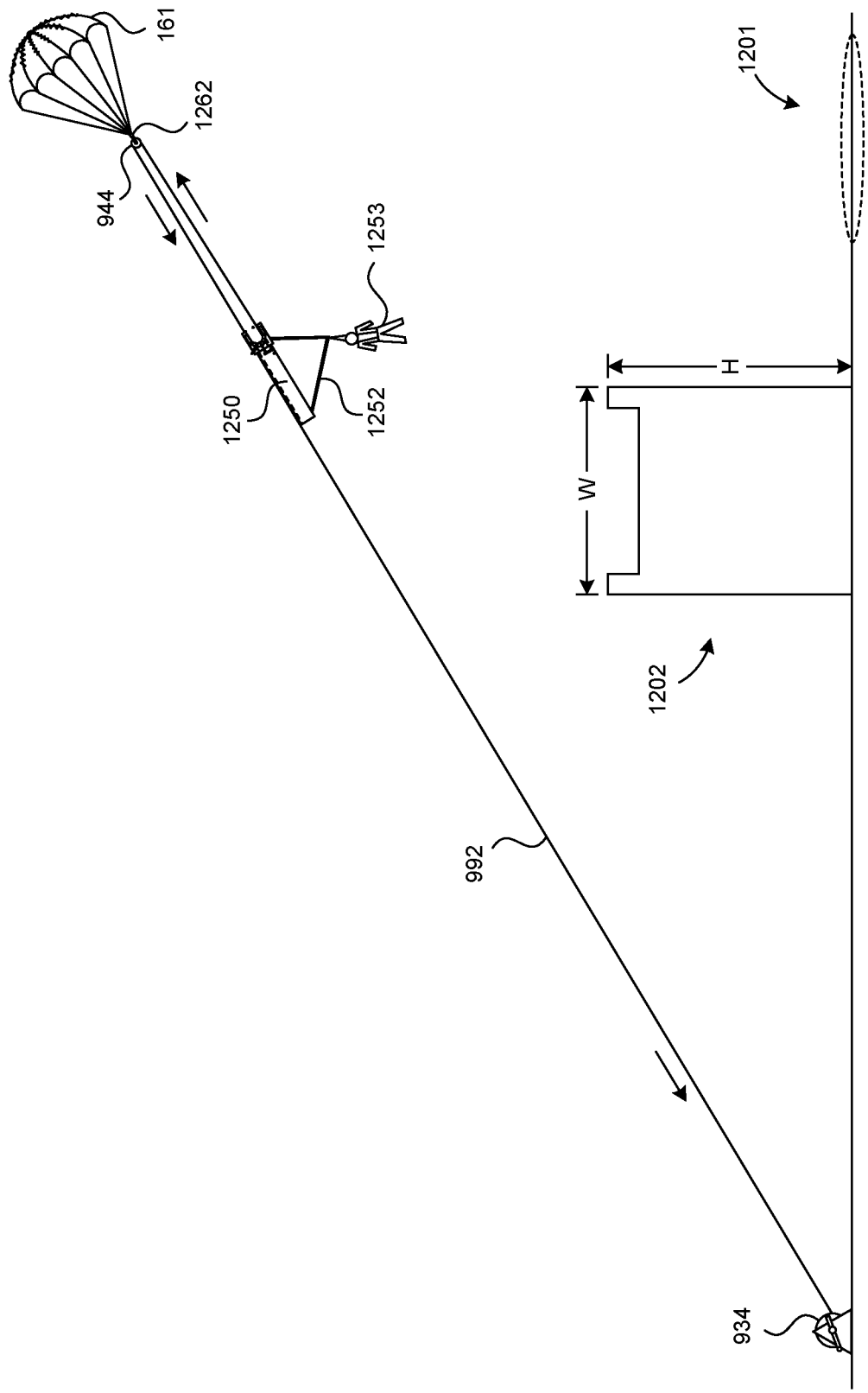

In FIG. 12B, the person 1253 has been lofted via the carriage 1250 to a position above and beyond the obstruction 1202. The parachute 161 is then used to gently guide the person 1253 to the landing zone 1201. For example, the tension device 934 can reel in the line 992 until the carriage 1250 engages with the pulley 944. At this point, the line 992 can be released, and the person 1253 (hanging from the parachute 161 via the harness 1252, the carriage 1250, the pulley 944, and a parachute connector 1262) descends to the landing zone 1201, as shown in FIG. 12C.

Figure 12C:
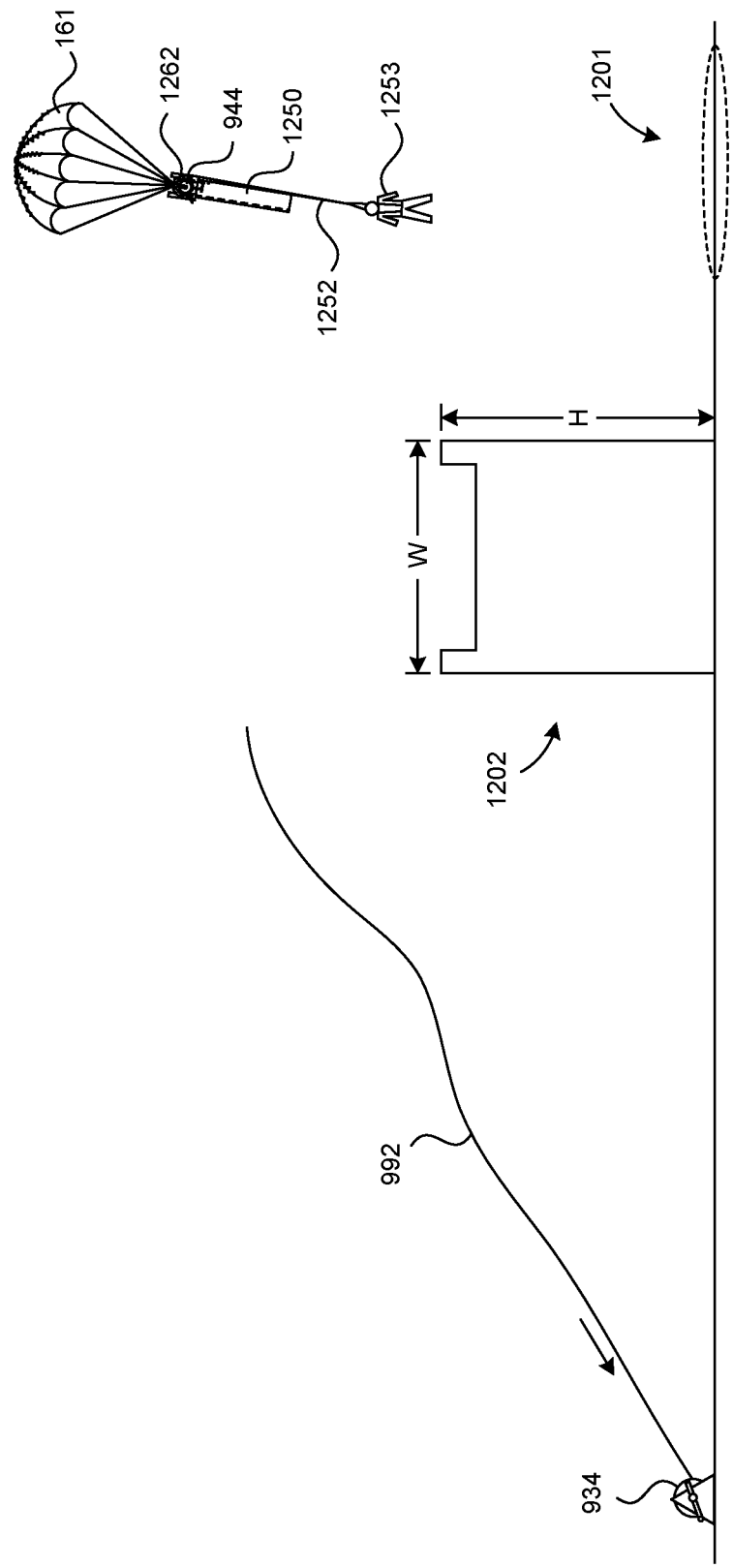

Referring now to FIG. 12C, the carriage 1250 has engaged the pulley 944. The pulley 944 is connected to the parachute 161 via the parachute connector 1262. The person 1253 is connected to the carriage 1250 via the harness 1252. Accordingly, the person 1253, together with the carriage 1250 and the pulley 944, descend to the landing zone 1201, under the braking force provided by the parachute 161. At the landing zone 1201, the carriage 1250, pulley 994, and parachute 1261 can be removed and discarded, or can be collected for reuse. Further details of a representative arrangement for connecting the carriage 1250 to the pulley 944, and releasing the line 992, are described below with reference to FIGS. 13A-13C.

Figure 13A:
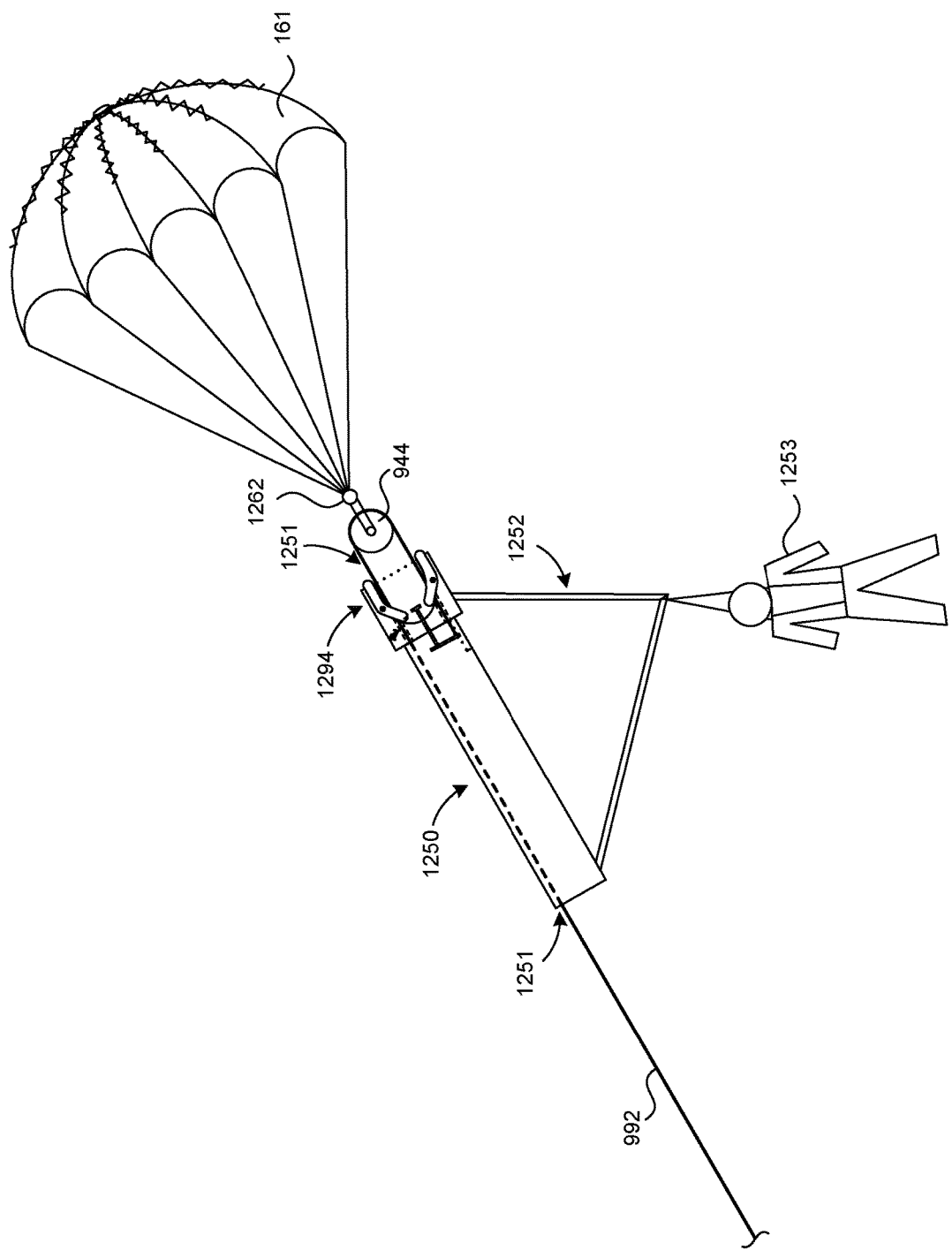
FIGS. 13A-13C illustrate further details of a carriage configured to loft a person or other payload, in accordance with embodiments of the present technology.

FIG. 13A is a partially schematic illustration of the carriage 1250, illustrating the line 992 attached to the releasable attachment device 1294 of the carriage 1250. The line 992 then passes around the pulley 944, and through the carriage 1250 (via apertures 1251) to the tension device 934 (FIG. 12C).

Figure 13B:
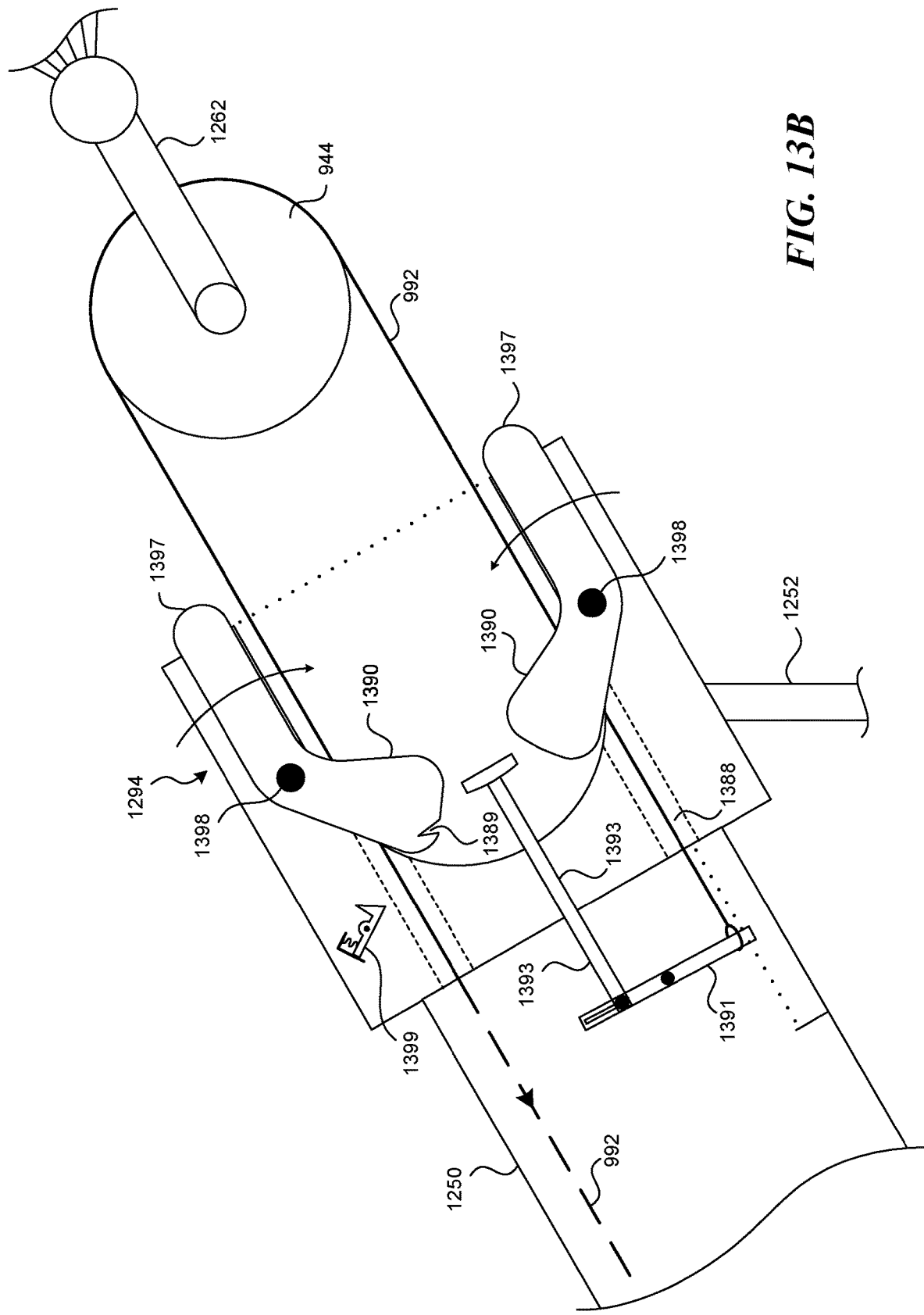

FIG. 13B illustrates an enlarged view of a portion of the carriage 1250 shown in FIG. 13A. One end of the line 992 is attached to a pivotable line retainer 1391, which is in turn connected to a line release rod 1393. The line release rod 1393 extends between two pulley capture jaws 1397, at least one of which is pivotable relative to the carriage 1250 via corresponding pivot pin 1398. For purposes of illustration, both jaws 1397 are shown as being pivotable in FIG. 13B. The jaws 1397 are shown in an open position in FIG. 13B. One or more of the jaws 1397 can include a lock receptacle 1389 which, when the jaw 1397 is pivoted to a closed position, engages with a lock 1399. Each jaw 1397 can have a pulley contact region 1390, described further below. When the carriage 1250 is pulled up to the pulley 944, the jaws 1397 close around the pulley 944, which triggers the line retainer 1391 to release the end of the line 992, as described in further detail below with reference to FIG. 13C.

Figure 13C:
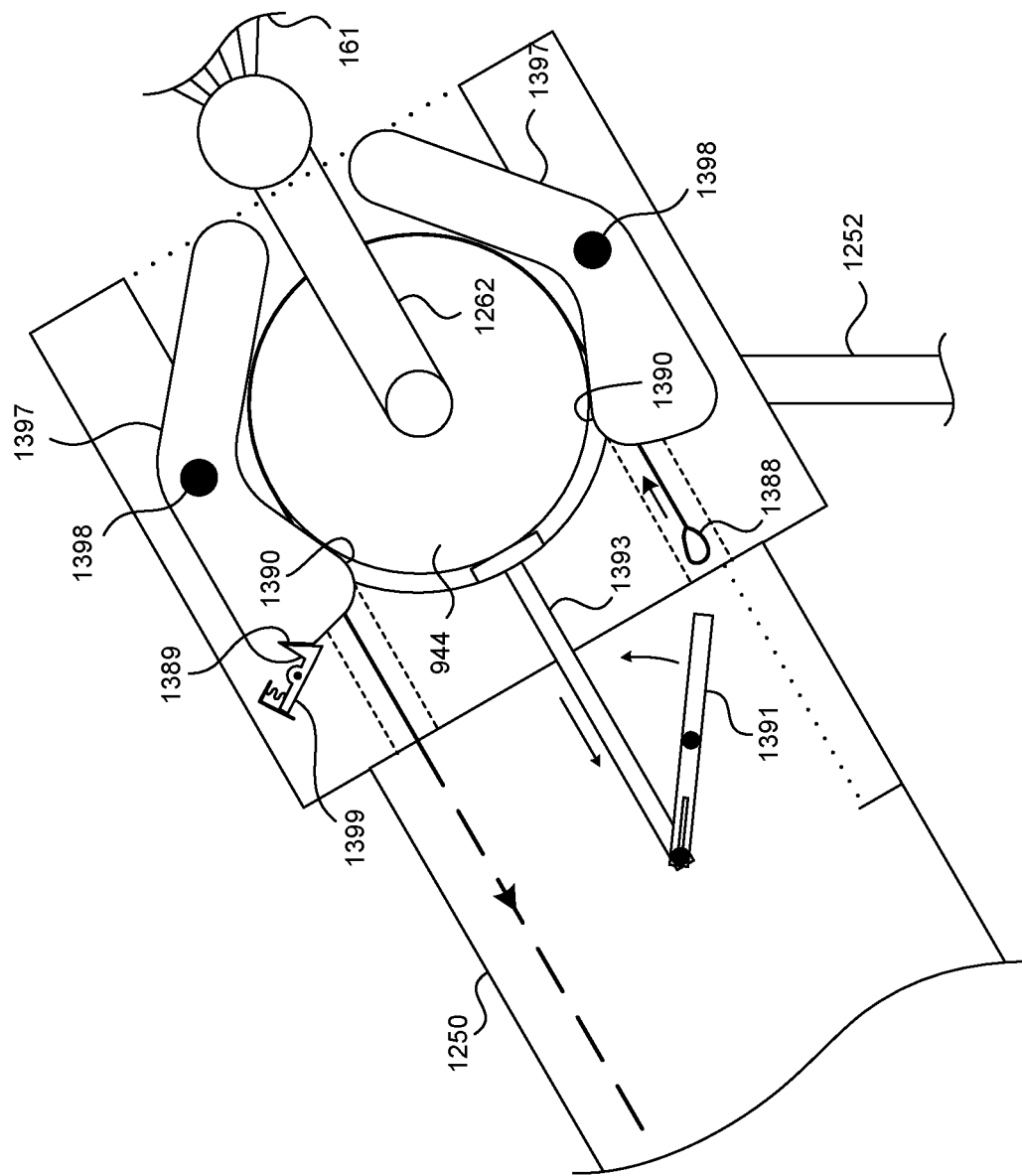

Referring now to FIG. 13C, the carriage 1250 has moved up to engage with the pulley 944. More particularly, the pulley 944 presses against the pulley contact regions 1390, causing the jaws 1397 to rotate about the respective pivot pins 1398 to at least partially encircle the pulley 944. At least one of the jaws 1397 engages the lock 1399, thus locking the pulley 944 to the carriage 1250.

As the carriage 1250 moves toward, and at least partially encloses, the pulley 944, the pulley 944 contacts the line release rod 1393. This in turn pivots the line retainer 1391, causing an end 1388 of the line 992 to release from the carriage 1250. The line 992 is then reeled in by the tension device 934 (FIG. 12C). The now-released carriage 1250 is firmly connected to the parachute 161 via the pulley 944 and the pulley connector 1262. The carriage 1250 (and therefore the parachute 161) is firmly connected to the person 1253 (FIG. 12C) via the harness 1252. The braking force provided by the parachute 161 guides the connected carriage 1250 and person 1253 to a soft, controlled landing.

An advantage of embodiments described above with reference to FIGS. 12A 13C is that the overall system can be used not only to loft an aircraft, but, in addition to or in lieu of lofting an aircraft, can loft or deliver a non-flying payload, such as a person. This arrangement can be used to loft personnel over obstructions, for example, to deliver military personnel and/or equipment into difficult-to-reach regions. In at least some embodiments, the approach can be more accurate and/or less detectable than using large fixed-wing aircraft or large rotorcraft to make such deliveries.

A feature of at least some of the embodiments described above is that the systems can include a lifting device carrying a capture line that is attached to a parachute, so as to reduce the velocity with which the capture line descends during and after a capture maneuver. An advantage of this arrangement is that a lifting device can be made more compact and transportable than devices having a fixed capture line hanging therefrom. For example, a relatively small UAV (e.g., a quadcopter) or a kite, or a balloon, can be used to lift the capture line and parachute from a space having a very small footprint. This allows the mission aircraft to be operated from tight quarters, as may be present in heavily forested areas, a boat deck, and/or other environments in which the mission aircraft is expected to perform.

The parachute can be used in other contexts as well. For example, the parachute can be used to slow the descent of a launching apparatus, in addition to, or in lieu of slowing the descent of a captured mission aircraft. In still further embodiments, a parachute can be used to launch the mission aircraft and, in some cases, the same parachute (or a different but similar or identical parachute) can be used to capture the mission aircraft after the mission has been performed. This approach can reduce the amount of hardware required to both launch and capture the aircraft, e.g., by providing an increased level of commonality between the elements used for launch and the elements used for capture thus in turn can significantly reduce the overall cost of manufacturing and operating the UAV system. In yet further embodiments, as described above, parachutes can be used to loft payloads other than unmanned aircraft, e.g., people and/or cargo.

From the foregoing, it will be appreciated that specific features of the disclosed technology have been described herein for purposes of illustration, but that various modifications may be made without deviating from the technology. For example, the lifting device(s) can have configurations other than those specifically described above. The carriage features described above for launching the mission aircraft (and/or other payloads) can have features other than those expressly described above. The releasable attachment devices can engage the mission aircraft (and/or the pulley, and/or other system elements) in accordance with techniques not specifically described herein.

Certain aspects of the technology described in the context of particular embodiments may be combined or eliminated in other embodiments. For example, the line control device shown in FIGS. 1A-1D can be used in the context of other systems described herein. The launch carriages described in the context of FIGS. 7A-7D can be used in combination with any of the launching devices described herein that include a carriage performing similar tasks. The controller shown in FIG. 1A can be used to control operation of any of the other elements shown and described herein.

While advantages associated with certain embodiments of the disclosed technology have been described in the context of those embodiments, other embodiments may also exhibit such advantages, and not all embodiments need necessarily exhibit such advantages to fall within the scope of the present technology. Accordingly, the present disclosure and associated technology can encompass other embodiments not expressly shown or described herein.

Several elements are shown schematically herein, and are not necessarily drawn to scale so as to better illustrate certain elements of the disclosed technology. As used herein, the phrase "and/or," as used, for example in the phrase "A and/or B," refers to A alone, B alone, and A and B. To the extent any materials incorporated herein by reference conflict with the present disclosure, the present disclosure controls. The following examples provide additional representative systems and methods in accordance with the present technology.

EXAMPLES

The following are representative examples of launch and/or recovery systems and methods for unmanned aircraft and/or other payloads. A representative system for lofting a payload includes a lifting device carrying a stowed parachute and a pulley depending from the parachute. The system further includes a tension device and a flexible line operably coupled between the tension device and the payload, with the flexible line passing around the pulley.

In further representative examples, the tension device can include a winch. The system can further comprise a carriage carried by, and moveable along, the flexible line, with the carriage being releasably couplable to the payload. For example, the carriage can include a releasable attachment device positioned to releasably engage the pulley. The releasable attachment device can be positioned to release the flexible line from the carriage. In another example, the carriage includes a releasable attachment device positioned to releasably engage an unmanned aerial vehicle, which comprises the payload. In still a further example, the payload includes a person, and the carriage includes a harness positioned to releasably attach to the person.

Representative methods for lofting a payload include directing a lifting device upwardly, releasing a parachute from the lifting device, with the parachute carrying a pulley and a flexible line passing around the pulley, and with the flexible line being connected between a tension device and a payload. The method can further include activating the tension device to reel in the flexible line and accelerate the payload upwardly.

In further representative examples, the payload can include a person, and/or cargo, for example, an unmanned aerial vehicle. The lifting device can include a separate, unmanned aerial vehicle. Accelerating the payload upwardly can include accelerating a carriage, with the carriage carrying the payload. When the system includes a carriage, the method can further include releasing the payload from the carriage, or releasing the payload and the carriage together to descend under a braking force provided by the parachute.

A representative unmanned aerial vehicle (UAV) system can include a lifting device, a parachute carried by the lifting device, and a capture line attached to the parachute and configured to engage with a corresponding engagement element carried by a UAV. The lifting device can include at least one of a kite, a lighter-than-air device, or a rocket. The parachute can be housed in a canister or other receptacle carried by the lifting device. In a further representative system, a line control device is connected to the capture line and includes a tension device to apply tension to, and/or reel in, the capture line.

A further representative system includes a first support configured to be carried by a first ground vehicle, a second support configured to be carried by a second ground vehicle, a carriage track couplable to the first and second supports, a carriage moveable along the carriage track, and a capture line attached to the carriage and configured to engage with a corresponding engagement element carried by the UAV. In further examples, the first and second vehicles can include first and second trucks, respectively. The carriage track can be rigid, flexible, and/or collapsible.

Another representative unmanned aerial vehicle (UAV) system includes a carriage track, a carriage moveable along the carriage track and configured to releasably support a UAV, and a driver coupled to the carriage to propel the carriage along the carriage track. For example, the driver can be fixed while the carriage moves along the track, and can include a compressed gas system, a compressed liquid system, a spring, or a chemical/rocket system. The carriage can include an engagement portion that engages with one or more of the wing, the fuselage, or a propeller spinner of the UAV.

What is claimed is:

1. An unmanned aerial vehicle (UAV) system, comprising:
   a lift device including a canister;
   a parachute stowed in and deployable from the canister, the lift device configured to elevate the canister to an altitude at which the parachute is to be deployed; and
   a capture line attached to the parachute and to a line control device, the line control device including a tension device, the parachute configured to deploy from the canister in response to the tension device reeling in the capture line when the lift device is at the altitude, the capture line configured to be engaged by a capture device located at an end of a wing of a UAV.

2. The system of claim 1, wherein the capture line is configured to be engaged by the capture device of the UAV after the parachute is deployed from the canister.

3. The system of claim 1, wherein the canister includes an extraction device configured to assist in deploying the parachute from the canister.

4. The system of claim 1, wherein the lift device is a rocket.

5. The system of claim 1, wherein the lift device is a balloon or a kite.

6. The system of claim 1, wherein the UAV to be engaged to the capture line is a second UAV, and wherein the lift device is a first UAV having an airframe, rotors, and landing gear, the canister carried by the airframe.

7. The system of claim 1, wherein the line control device includes a landing structure, the tension device configured to reel in the capture line to cause the landing structure to be engaged by the UAV that is engaged to the capture line, the landing structure configured to cushion the UAV.

8. The system of claim 7, wherein the landing structure is inflatable or collapsible.

9. The system of claim 7, wherein the landing structure has a conical shape.

10. The system of claim 7, wherein the landing structure includes a first aperture and a second aperture, and wherein the capture line passes through the first aperture and the second aperture to connect to the tension device.

11. The system of claim 1, wherein the tension device includes a winch.

12. The system of claim 1, wherein the line control device includes a line support element through or around which the capture line passes.

13. A method for capturing an unmanned aerial vehicle (UAV), the method comprising:
    elevating a lift device to an altitude at which a parachute is to be deployed, the parachute being stowed in and deployable from a canister, the lift device carrying the canister;
    deploying the parachute from the canister in response to a tension device of a line control device reeling in a capture line when the lift device is at the altitude, the capture line attached to the parachute and to the line control device; and
    engaging a capture device located at an end of a wing of the UAV to the capture line.

14. The method of claim 13, wherein the capture device of the UAV engages the capture line subsequent to the parachute being deployed from the canister.

15. The method of claim 13, further comprising assisting deployment of the parachute from the canister via an extraction device.

16. The method of claim 13, wherein the lift device is a rocket.

17. The method of claim 13, wherein the lift device is a balloon or a kite.

18. The method of claim 13, wherein the UAV to be engaged to the capture line is a second UAV, and wherein the lift device is a first UAV having an airframe, rotors, and landing gear, the canister carried by the airframe.

19. The method of claim 13, further comprising, subsequent to engaging the capture device of the UAV to the capture line, reeling in the capture line via the tension device of the line control device to cause the UAV to engage a landing structure of the line control device, the landing structure configured to cushion the UAV.

20. The method of claim 19, wherein the landing structure is inflatable or collapsible.

21. The method of claim 19, wherein the landing structure has a conical shape.

22. The method of claim 19, wherein the landing structure includes a first aperture and a second aperture, and wherein the capture line passes through the first aperture and the second aperture to connect to the tension device.

23. The method of claim 13, wherein the tension device includes a winch.

24. The method of claim 13, wherein the line control device includes a line support element through or around which the capture line passes.

* * * * *